US006441116B1

United States Patent
Shikuma et al.

(10) Patent No.: US 6,441,116 B1
(45) Date of Patent: *Aug. 27, 2002

(54) ETHYLENIC COPOLYMER, COMPOSITION CONTAINING SAID COPOLYMER, AND ETHYLENIC COPOLYMER FILM

(75) Inventors: Haruo Shikuma; Shuji Machida; Motoharu Ishikawa; Shinichi Kurokawa, all of Sodegaura (JP)

(73) Assignee: Idemitsu Kosan Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,920

(22) Filed: Oct. 18, 1999

Related U.S. Application Data (63) Continuation of application No. 08/922,564, filed on Sep. 3, 1997, now abandoned.

(51) Int. Cl.[7] ............................................... C08F 210/16
(52) U.S. Cl. ..................... 526/348; 526/348.1; 526/160
(58) Field of Search ................................. 526/348, 160, 526/943, 348.1

(56) References Cited

U.S. PATENT DOCUMENTS

| | | | | |
|---|---|---|---|---|
| 4,897,455 A | | 1/1990 | Welborn, Jr. ................ | 526/129 |
| 5,084,534 A | * | 1/1992 | Welborn et al. ............ | 526/160 |
| 5,494,874 A | | 2/1996 | Rosen et al. ................ | 502/155 |
| 5,739,225 A | * | 4/1998 | Tazaki et al. ................ | 526/127 |
| 5,756,607 A | * | 5/1998 | Lux et al. .................... | 526/127 |
| 5,863,853 A | | 1/1999 | Vaughan et al. ............ | 502/108 |
| 5,874,513 A | | 2/1999 | Watanabe et al. ........ | 526/348.1 |

FOREIGN PATENT DOCUMENTS

| | | |
|---|---|---|
| EP | 0 598 134 A1 | 5/1992 |
| EP | 0 572 034 A2 | 12/1993 |
| JP | 5-331228 | 5/1992 |
| JP | 5-331237 | 5/1992 |
| JP | 5320246 | 12/1993 |
| WO | WO95/18158 * | 7/1995 |
| WO | WO95/18160 * | 7/1995 |

* cited by examiner

*Primary Examiner*—David W. Wu
*Assistant Examiner*—R. Rabago
(74) *Attorney, Agent, or Firm*—Parkhurst & Wendell, L.L.P.

(57) ABSTRACT

A film formed of an ethylenic copolymer having Mw/Mn of 1.5 to 4, Mw of 3,000 to 1,000,000, and a resin density of 0.85 to 0.95 g/cm$^3$. In the copolymer compositional distribution curve, the relationship between the half width at the half maximum [W/2] of the Gaussian distribution curve, and the average, n, of short-chain branches in the copolymer satisfies the equation, $0.704+0.147n \leq W/2 \leq -0.055+0.577n$. The tear strength (TS, kgf/cm) of the copolymer satisfies equations, $$TS \geq 131.5 - 155 \times \log[\{(B+C+D)/A\}+0.1],$$

and $$0.1 \leq (B+C+D)/A \leq 1$$

where A is the area surrounding the Gaussian distribution curve and the base line of the compositional distribution curve; B is the area surrounding the compositional distribution curve, the curve obtained through Gaussian distribution approximation, and the base line, B being at an elution temperature higher than 32° C.; C is the area surrounding the essential peak, Gaussian distribution approximation curve, and the base line; and D is the area surrounding the compositional distribution curve and the base line and falling within an elution temperature range between 25 and 32° C. indicating a high branch component.

2 Claims, 1 Drawing Sheet

ETHYLENIC COPOLYMER, COMPOSITION CONTAINING SAID COPOLYMER, AND ETHYLENIC COPOLYMER FILM

This is a Continuation of application Ser. No. 08/922,564 filed Sep. 3, 1997 now abandoned.

FIELD OF THE INVENTION

The present invention relates to an ethylenic copolymer, an ethylenic copolymer composition, and an ethylenic copolymer film. More precisely, it relates to an ethylenic copolymer which has a narrow molecular weight distribution and a narrow branching degree distribution and has a controlled compositional distribution profile and which can be formed into a film having good mechanical characteristics including tear strength, etc., good heat-sealing properties and good ESCR (environmental stress crack resistance); to an ethylenic copolymer composition containing said copolymer; and to an ethylenic copolymer film having excellent characteristics such as those mentioned above.

BACKGROUND OF THE INVENTION

Heretofore, ethylenic copolymers such as ethylene-α-olefin copolymers have been being used widely in various fields as popular resins. Ethylenic copolymers are produced in the presence of heterogeneous catalysts. However, ethylenic copolymers as produced in the presence of heterogeneous catalysts have a broad molecular weight distribution and a broad branching degree distribution, and contain a large amount of low-molecular components having a high branching degree. Therefore, it is known that films to be formed from such ethylenic copolymers have low impact strength, poor heat-sealing properties and low ESCR. On the other hand, as having a low degree of anisotropy (imbalance between the lengthwise strength and the widthwise strength), the films are advantageous in that they have high tear strength which is important as one physical property of films.

Recently, homogeneous metallocene catalysts having a high catalytic activity and capable of catalyzing high copolymerization have been developed. Ethylenic copolymers as produced in the presence of such metallocene catalysts shall have a narrow molecular weight distribution and a narrow branching degree distribution (that is, the distribution of the number of branches constituting the copolymer is narrow), and contain a small amount of low-molecular components having a high branching degree. Therefore, it is known that films of such ethylenic copolymers can have improved heat-sealing properties, impact strength and ESCR.

Some ethylenic copolymers as produced in the presence of such metallocene catalysts (often referred to as single-site catalysts) are known. For example, U.S. Pat. No. 5,272,236 discloses ethylene-α-olefin copolymers as produced in the presence of metallocene catalysts. Since the copolymers disclosed have a narrow compositional distribution, films of the copolymers may have improved impact strength and ESCR. However, since the films have a large degree of anisotropy, they are defective in that they have low tear strength. On the other hand, single-site, linear low-density polyethylenes are commercially available. For example, known is a commercial product of Exact which is a trade name of Exxon. However, since this has a narrow compositional distribution and comprises a comonomer of hexene-1 or an α-olefin lower than hexene-1, the tear strength of films to be formed from it is not improved to such a degree as expected, though the heat-sealing property of the films may be desirably improved.

Given this situation, various attempts have heretofore been made to blend different copolymers thereby to control the branching degree distribution and the molecular weight distribution of the resulting copolymer mixtures. However, regarding the tear strength and the impact strength of films to be formed from such copolymer mixtures, if one of the two is increased, the other is lowered. At present, therefore, films having both high tear strength and high impact strength are unknown.

Japanese Patent Application PCT-through Laid-Open No. 502710/1991 discloses a composition comprising an ethylenic copolymer as obtained in the presence of a homogeneous catalyst. However, this refers to nothing about the impact strength of films of the composition, though referring to the improvement in the tear strength of the films. Japanese Patent Application Laid-Open Nos. 136195/1994, 136196/1994 and 207057/1994 disclose compositions comprising two different copolymers both having a narrow compositional distribution and characterized by their melt tension but each having a different density and a different melt flow rate (MFR), and the compositions disclosed are said to form films with improved impact strength. However, the compositions disclosed are characterized by comprising copolymers each having a different molecular weight, and are therefore defective in that their molecular weight distribution is broad and that the mechanical strength, such as tensile strength, of the films of the compositions is low.

Accordingly, it is desired to provide an ethylenic copolymer which has a narrow molecular weight distribution and a narrow branching degree distribution, of which the compositional distribution profile can be freely controlled, and which can be formed into films having both high tensile strength and high impact strength irrespective of the molecular weight distribution of the copolymer, and also to provide a composition comprising such an ethylenic copolymer.

SUMMARY OF THE INVENTION

Given this situation, the object of the present invention is to provide an ethylenic copolymer which has a narrow molecular weight distribution, a narrow branching degree distribution and a controlled compositional distribution profile, and forms a film having good mechanical characteristics including tear strength, etc., and having good heat-sealing properties and good ESCR; to provide an ethylenic copolymer composition which comprises said ethylenic copolymer and an additional ethylenic copolymer having a narrow molecular weight distribution and a broad compositional distribution and capable of forming films with high tear strength, and which forms a film having both good impact strength and good tear strength, or that is, the tear strength of the film is improved without sacrificing its impact strength; and to provide an ethylenic copolymer film having good characteristics such as those mentioned above.

In order to attain the above-mentioned object, we, the present inventors have assiduously studied and, as a result, have found that an ethylenic copolymer which is obtained through copolymerization of (a) ethylene and (b) at least one selected from α-olefins having from 3 to 20 carbon atoms, diene compounds and cyclic olefins and which has specific properties, and an ethylenic copolymer composition containing said copolymer can attain the intended object. On the basis of these findings, we have completed the present invention.

Specifically, the present invention provides the following:

(1) an ethylenic copolymer (I) obtained through copolymerization of (a) ethylene and (b) at least one selected from α-olefins having from 3 to 20 carbon atoms, diene compounds and cyclic olefins, which is characterized in that (1) the ratio of the weight average molecular weight (Mw) of the copolymer to the number average molecular weight (Mn) thereof, Mw/Mn, falls between 1.5 and 4, said molecular weights being measured through gel permeation chromatography in terms of polyethylene, and the weight average molecular weight (Mw) falls between 3,000 and 1,000,000, (2) the relationship between the half width at the half maximum [W/2] of the curve as obtained through Gaussian distribution approximation relative to the essential peak of the compositional distribution curve of the copolymer obtained through temperature rising elution fractionation analysis, and the average, n, of short-chain branches existing in the copolymer (per 1000 carbons of the copolymer) satisfies the following equation:

$$0.704+0.147n \leq W/2 \leq -0.055+0.577n,$$

and (3) the resin density of the copolymer falls between 0.85 and 0.95 g/cm$^3$;

(2) an ethylenic copolymer (II) obtained through copolymerization of (a) ethylene and (b) at least one selected from α-olefins having from 3 to 20 carbon atoms, diene compounds and cyclic olefins, which is characterized in that the ratio of the weight average molecular weight (Mw) of the copolymer to the number average molecular weight (Mn) thereof, Mw/Mn, falls between 1.5 and 4, said molecular weights being measured through gel permeation chromatography in terms of polyethylene, that the resin density of the copolymer falls between 0.85 and 0.95 g/cm$^3$, and that the tear strength (TS, kgf/cm) of the copolymer satisfies the following equations:

$$TS \geq 131.5 - 155 \times \log[\{(B+C+D)/A\}+0.1],$$

and $$0.1 \leq -(B+C+D)/A \leq -1$$

where A indicates the area of the range which is surrounded by the curve as obtained through Gaussian distribution approximation relative to the essential peak of the compositional distribution curve of the copolymer obtained through temperature rising elution fractionation analysis, and the base line of said compositional distribution curve; B indicates the area of the range which is surrounded by said compositional distribution curve, said curve obtained through Gaussian distribution approximation relative to said essential peak, and said base line, and which is in the lower elution temperature side and is at an elution temperature higher than 32° C., while C indicates the area of the range which is surrounded by said three and which is in the higher elution temperature side; and D indicates the area of the range which is surrounded by said compositional distribution curve and said base line and which is at an elution temperature between 25 and 32° C.;

(3) an ethylenic copolymer composition (I) comprising;

(A) an ethylenic copolymer which is obtained through copolymerization of (a) ethylene and (b) an α-olefin having from 3 to 20 carbon atoms, and which is such that (1) the ratio of the weight average molecular weight (Mw) of the copolymer to the number average molecular weight (Mn) thereof, Mw/Mn, falls between 1.5 and 4, said molecular weights being measured through gel permeation chromatography in terms of polyethylene, and the weight average molecular weight (Mw) falls between 3,000 and 1,000,000, (2) the relationship between the half width at the half maximum [W/2] of the curve as obtained through Gaussian distribution approximation relative to the essential peak of the compositional distribution curve of the copolymer obtained through temperature rising elution fractionation analysis, and the average, n, of short-chain branches existing in the copolymer (per 1000 carbons of the copolymer) satisfies the following equation:

$$0.704+0.147n \leq W/2 \leq -0.055+0.577n,$$

and (3) the resin density of the copolymer falls between 0.85 and 0.95 g/cm$^3$; and (B) an ethylenic copolymer which is obtained through copolymerization of (a) ethylene and (b) an α-olefin having from 3 to 20 carbon atoms, and which is such that the weight average molecular weight (Mw) of the copolymer as measured through gel permeation chromatography in terms of polyethylene falls between 3,000 and 1,000,000, and that the resin density of the copolymer falls between 0.85 and 0.95 g/cm$^3$;

(4) an ethylenic copolymer composition (II) which is one embodiment of the composition (I) of said (3) and which is characterized in that the ethylenic copolymer of the component (A) in (3) is obtained through copolymerization of (a) ethylene and (b) an α-olefin having from 3 to 20 carbon atoms and is such that the ratio of the weight average molecular weight (Mw) of the copolymer to the number average molecular weight (Mn) thereof, Mw/Mn, falls between 1.5 and 4, said molecular weights being measured through gel permeation chromatography in terms of polyethylene, that the resin density of the copolymer falls between 0.85 and 0.95 g/cm$^3$, and that the tear strength (TS, kgf/cm) of the copolymer satisfies the following equations:

$$TS \geq 131.5 - 155 \times \log[\{(B+C+D)/A\}+0.1],$$

and $$0.1 \leq (B+C+D)/A \leq 1$$

where A indicates the area of the range which is surrounded by the curve as obtained through Gaussian distribution approximation relative to the essential peak of the compositional distribution curve of the copolymer obtained through temperature rising elution fractionation analysis, and the base line of said compositional distribution curve; B indicates the area of the range which is surrounded by said compositional distribution curve, said curve obtained through Gaussian distribution approximation relative to said essential peak, and said base line, and which is in the lower elution temperature side and is at an elution temperature higher than 32° C., while C indicates the area of the range which is surrounded by said three and which is in the higher elution temperature side; and D indicates the area of the range which is surrounded by said compositional distribution curve and said base line and which is at an elution temperature between 25 and 32° C.; and (5) an ethylenic copolymer film to be prepared by filming any of said ethylenic copolymer of (1) or (2), or said ethylenic copolymer composition of (3) or (4).

DISCLOSURE OF THE INVENTION

The ethylenic copolymers (I) and (II) of the present invention are obtained through copolymerization of (a)

ethylene and (b) at least one selected from α-olefins having from 3 to 20 carbon atoms, diene compounds and cyclic olefins. The α-olefins having from 3 to 20 carbon atoms which are used as comonomers of the component (b) include, for example, propylene, 1-butene, 1-pentene, 4-methyl-1-pentene, 1-hexene, 1-octene, 1-decene, 1-dodecene, 1-tetradecene, 1-octadecene, 1-eicosene, etc.

The diene compounds may be conjugated diolefins and non-conjugated diolefins. The conjugated diolefins include, for example, 1,3-butadiene, isoprene, chloroprene, 1,3-cyclohexadiene, 1,3-cyclooctadiene, etc. The non-conjugated diolefins include, for example, α,ω-diene compounds such as 1,5-hexadiene and 1,7-octadiene, and their derivatives; and cyclic diolefins such as norbornadiene, dicyclopentadiene, 5-vinylnorbornene and ethylidenenorbornene, and their derivatives.

The cyclic olefins include, for example, norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 1,4,5,8-dimethan-1,2,3,4,4a,5,8,8a-octahydronaphthalene, 2-methyl-1,4,5,8-dimethan-1,2,3,4,4a,5,8,8a-octahydronaphthalene, 2-cyclohexyl-1,4,5,8-dimethan-1,2,3,4,4a,5,8,8a-octahydronaphthalene, 2,3-dichloro-1,4,5,8-dimethan-1,2,3,4,4a,5,8,8a-octahydronaphthalene, 2-isobutyl-1,4,5,8-dimethan-1,2,3,4,4a,5,8,8a-octahydronaphthalane, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxylnorbornene anhydrate, 5-dimethylaminonorbornene, 5-cyanonorbornene, 2-ethyl-1,4,5,8-dimethan-1,2,3,4,4a,5,8,8a-octahydronaphthalene, 2,3-dimethyl-1,4,5,8-dimethan-1,2,3,4,4a,5,8,8a-octahydronaphthalene, 2-hexyl-1,4,5,8-dimethan-1,2,3,4,4a,5,8,8a-octahydronaphthalene, 2-ethylidene-1,4,5,8-dimethan-1,2,3,4,4a,5,8,8a-octahydronaphthalene, 2-fluoro-1,4,5,8-dimethan-1,2,3,4,4a,5,8,8a-octahydronaphthalene, 1,5-dimethyl-1,4,5,8-dimethan-1,2,3,4,4a,5,8,8a-octahydronaphthalene, etc.

These comonomers of the component (b) may be used singly or as combined. Especially preferred are α-olefins having from 3 to 20 carbon atoms.

Where the ethylenic copolymers (I) and (II) of the present invention are copolymers as obtained through copolymerization of ethylene, and an α-olefin and/or a cyclic olefin, they desirably have a total comonomer unit content of from 1 to 20 mol % in order to have the intended good properties. Where at least a diene compound is used as the comonomer to prepare the ethylenic copolymers (I) and (II), the diene compound unit content of the copolymers is desirably not larger than 1 mol %. If the diene compound unit content is larger than 1 mol %, the copolymers will often be crosslinked to give gel. For the purpose of preventing the copolymers from being gelled, the diene compound unit content of the copolymers is more preferably not larger than 0.8 mol %, even more preferably not larger than 0.6 mol %, most preferably not larger than 0.4 mol %. The total content of the other comonomer units in said copolymers is favorably from 0.01 to 20 mol % in order that the copolymers may have the intended good properties.

The ethylenic copolymers (I) of the present invention are characterized by having the following properties (1), (2) and (3).

First, (1) the ratio of the weight average molecular weight (Mw) of the copolymer to the number average molecular weight (Mn) thereof, Mw/Mn, falls between 1.5 and 4, said molecular weights being measured through gel permeation chromatography in terms of polyethylene, and Mw falls between 3,000 and 1,000,000. If the ratio Mw/Mn is smaller than 1.5, the shapability and workability of the copolymers is poor; but if the ratio is larger than 4, the physical properties, such as impact strength, of the copolymers are poor. In view of the balance of the shapability and moldability and the physical properties of the copolymers, the ratio Mw/Mn is preferably from 1.8 to 3.8, more preferably from 2.0 to 3.5. The copolymers having an Mw of smaller than 3,000 could not have satisfactory mechanical properties, but those having an Mw of larger than 1,000,000 have poor shapability and workability. In view of the balance of the mechanical properties and the shapability and workability of the copolymers, the copolymers preferably have an Mw of from 10,000 to 800,000, more preferably from 15,000 to 600,000.

The above-mentioned Mw and Mn are obtained through GPC in terms of polyethylene, using a device of Waters ALC/GPC150C with columns of TSK HM+GMH6 (×2) at a flow rate of 1.0 ml/min and at a temperature of 135° C. The solvent used in this device is 1,2,4-trichlorobenzene.

Next, (2) the relationship between the half width at the half maximum [W/2] of the curve as obtained through Gaussian distribution approximation relative to the essential peak of the compositional distribution curve of the copolymer obtained through temperature rising elution fractionation analysis, and the average, n, of short-chain branches existing in the copolymer (per 1000 carbons of the copolymer) satisfies the following equation:

$$0.704+0.147n \leq W/2 \leq -0.055+0.577n.$$

If said W/2 is smaller than (0.704+0.147n), the copolymers have poor shapability and workability. If, however, it is larger than (−0.055+0.577n), the films to be formed from the copolymers have poor mechanical properties. In view of the balance of the shapability and workability of the copolymers and the physical properties of the films to be formed from the copolymers, the relation between W/2 and n is preferably, $$1.0+0.147n \leq W/2 \leq -0.08+0.577n;$$

more preferably, $$1.5+0.147n \leq W/2 \leq -0.1+0.577n;$$

even more preferably, $$2.0+0.147n \leq W/2 \leq -0.2+0.577n.$$

The above-mentioned W/2 is obtained through temperature rising elution fractionation analysis. Precisely, a polymer solution in o-dichlorobenzene having a controlled polymer concentration of about 6 g/liter at 135° C. is introduced into a column (inner diameter: 10 mm, length: 250 mm) filled with a filler of Chromosorb PNAN (80/100 mesh), via a flow-controlling pump. This is cooled to 30° C. at a cooling rate of 10° C./hr, whereby the filler adsorbs the polymer. Next, o-dichlorobenzene is introduced into the column at a flow rate of 2 cc/min, while heating the column at a heating rate of 20° C./hr. The concentration of the polymer thus eluted out of the column is measured with an infrared detector (1-A Fox Boro CVF with a cell of $CaF_2$), from which is obtained the compositional distribution curve of the polymer relative to the elution temperature. Next, a curve that is approximate to the Gaussian distribution relative to the essential peak of said compositional distribution curve is formed, of which is obtained the half width at the half maximum, W/2. The average, n, of short-chain branches existing in the polymer is obtained through $^1$H-NMR, using Nippon Denshi (JNM)'s JSK-400 (at 400 MHz, 130° C., in a mixed solvent of 1,2,4-trichlorobenzene/heavy benzene). The intended average value, n, is obtained from the peak intensities of methyl group and methylene group.

Last, (3) the resin density of the copolymer must fall between 0.85 and 0.95 g/cm$^3$. This resin density can be desirably controlled within the defined range, by increasing or decreasing the comonomer unit content of the copolymer. The copolymer having a resin density of from 0.85 to 0.90 g/cm$^3$ is favorably used as an olefin modifier. On the other hand, the copolymer having a resin density of larger than 0.90 g/cm$^3$ but not larger than 0.95 g/cm$^3$ is favorable as a substrate for highly functional films with high strength. To obtain its resin density, the copolymer is formed into a film under pressure at 190° C., and then rapidly cooled, and the resulting film is subjected to density gradient tube method.

On the other hand, the ethylenic copolymer (II) of the present invention must have the following properties. Like the above-mentioned ethylenic copolymer (I), the ethylenic copolymer (II) must have a ratio, Mw/Mn of from 1.5 to 4, preferably from 1.8 to 3.8, more preferably from 2.0 to 3.5, and has a resin density of from 0.85 to 0.95 g/cm$^3$. In addition, the tear strength (TS, kgf/cm) of the copolymer (II) must satisfy the following equations:

$$TS \geq 131.5 - 155 \times \log[\{(B+C+D)/A\}+0.1],$$

and $$0.1 \leq (B+C+D)/A \leq -1$$

where A indicates the area of the range which is surrounded by the curve as obtained through Gaussian distribution approximation relative to the essential peak of the compositional distribution curve of the copolymer obtained through temperature rising elution fractionation analysis, and the base line of said compositional distribution curve; B indicates the area of the range which is surrounded by said compositional distribution curve, said curve obtained through Gaussian distribution approximation relative to said essential peak, and said base line, and which is in the lower elution temperature side and is at an elution temperature higher than 32° C., while C indicates the area of the range which is surrounded by said three and which is in the higher elution temperature side; and D indicates the area of the range which is surrounded by said compositional distribution curve and said base line and which is at an elution temperature between 25 and 32° C.

Figure 1:
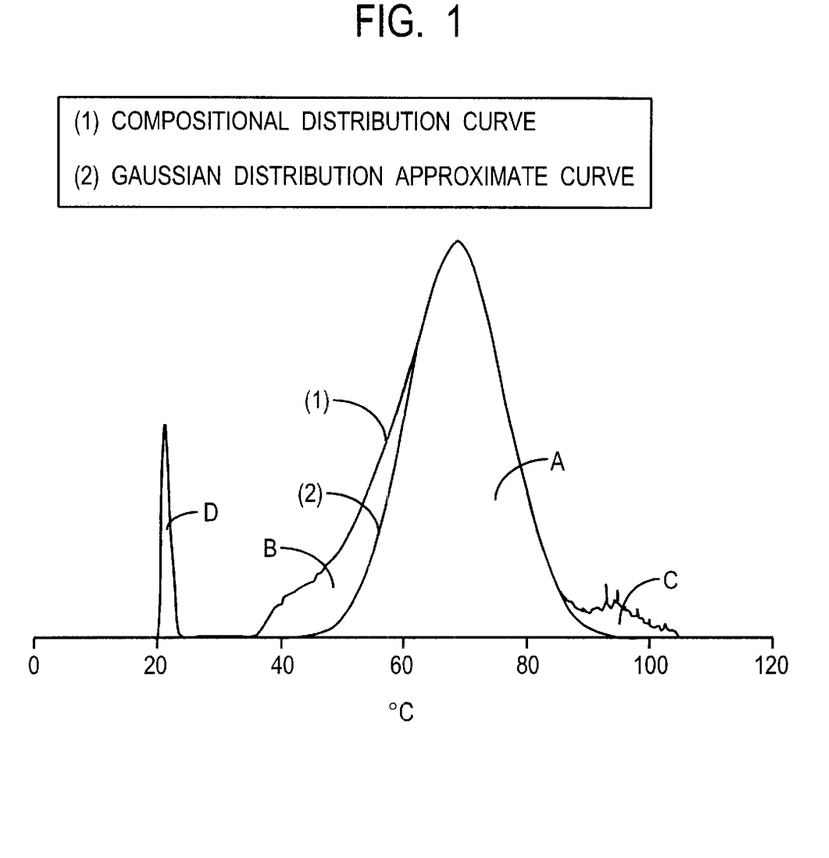
FIG. 1 shows a compositional distribution curve of an ethylenic copolymer obtained through temperature rising elution fractionation analysis to determine the compositional distribution of said copolymer, and a curve obtained through Gaussian distribution approximation relative to the essential peak of said compositional distribution curve.

The areas of these regions A, B, C and D are obtained as follows: First, in the same manner as in the case of the ethylenic copolymer (I), the compositional distribution curve of the copolymer (II) is obtained through temperature rising elution fractionation analysis as in FIG. 1. Next, a curve that is approximate to the Gaussian distribution relative to the essential peak of said compositional distribution curve is formed as in FIG. 1. In FIG. 1, A is the area of the range as surrounded by said curve obtained through such Gaussian distribution approximation, and the base line. B is the area of the range which is surrounded by said compositional distribution curve, said curve obtained through Gaussian distribution approximation relative to said essential peak, and said base line, and which is in the lower elution temperature side and is at an elution temperature higher than 32° C., while C is the area of the range which is surrounded by said three, the compositional distribution curve, the curve obtained through Gaussian distribution approximation relative to the essential peak and the base line, and which is in the higher elution temperature side. The area C indicates the amount of the component with high crystallinity. The Gaussian distribution approximation relative to the essential peak of the compositional distribution curve of the copolymer is made herein in such a manner that the resulting approximate curve may fit in with said compositional distribution curve in the higher elution temperature side. D is the area of the range which is surrounded by said compositional distribution curve and said base line and which is at an elution temperature between 25 and 32° C., and indicates the amount of the component having a high branch content. If the tear strength, TS, of the copolymer is smaller than $(131.5 - 155 \times \log[\{(B+C+D)/A\}+0.1])$, the properties of the film of the copolymer are bad. In view of the properties of the film of the copolymer, the tear strength, TS, of the copolymer preferably satisfies the following equation:

$$TS \geq 135.5 - 160 \times \log[\{(B+C+D)/A\}+0.1],$$

more preferably, $$TS \geq 141.5 - 170 \times \log[\{(B+C+D)/A\}+0.1].$$

The tear strength, TS (kgf/cm) of the copolymer is obtained as follows: Using a 50-ton press, the copolymer is pressed at 230° C. and under a pressure of from 30 to 50 kg/cm$^2$ for 4 minutes into a sheet having a thickness of from 60 to 70 μm and a size of 20 cm×20 cm. Next, this sheet is cut to give a test piece having an uniform thickness and having a size of 10 cm×10 cm, and the test piece is subjected to an Elemendorf tearing test in accordance with JIS K-7128. Four sheets of the same copolymer are subjected to the tearing test, and the tear strength of the copolymer tested is represented by the average of the data obtained.

Like the ethylenic copolymer (I), the ethylenic copolymer (II) that satisfies the above-mentioned requirements is preferably such that its Mw is from 3,000 to 1,000,000, preferably from 10,000 to 800,000, more preferably from 15,000 to 600,000 and that the relation between the half width at the half maximum [W/2] of the copolymer and the average, n, of short-chain branches existing in the copolymer (per 1000 carbons of the copolymer) satisfies the following equation:

$$0.704 + 0.147n \leq W/2 \leq -0.055 + 0.577n,$$

preferably, $$1.0 + 0.147n \leq W/2 \leq -0.08 + 0.577n,$$

more preferably, $$1.5 + 0.147n \leq W/2 \leq -0.1 + 0.577n,$$

even more preferably,

$$2.0 + 0.147n \leq W/2 \leq -0.2 + 0.577n,$$

in view of the workability of the copolymer and the physical properties of the film to be formed from the copolymer.

The production of the ethylenic copolymers (I) and (II) of the present invention is not specifically defined, provided that the copolymers produced have the above-mentioned properties. Various methods are employable for the production of the copolymers. For example, one advantageous method of producing the copolymers comprises copolymerizing ethylene and desired comonomers in the presence of a polymerization catalyst which will be referred to hereinunder.

Preferred examples of the polymerization catalyst are the following (I), (II) and (III):

(I) A polymerization catalyst comprising;
(A) a transition metal compound of a general formula (Ia):

(Ia)

wherein
$M^1$ represents a metal element of the Group 3 to the Group 10 or the lanthanoid series in the Periodic Table,
$X^1$ represents a ligand that bonds to $M^1$ via σ-bonding, and where the formula has a plurality of $X^1$'s, said plural $X^1$'s may be the same or different, and the indenyl ring may be crosslinked with $Y^1$;
$Y^1$ represents a Lewis base, and where the formula has a plurality of $Y^1$'s, said plural $Y^1$'s may be the same or different, and the indenyl ring may be crosslinked with $X^1$;
A represents a crosslinking group;
p represents an integer of from 1 to 20;
q represents an integer of from 1 to 5 [(atomic valency of $M^1$)–2];
r represents an integer of from 0 to 3;
$R^1$ to $R^8$ each represent a hydrogen atom, a halogen atom, a hydrocarbon group having from 1 to 20 carbon atoms, a halogen-containing hydrocarbon group having from 1 to 20 carbon atoms, a silicon-containing group, or a hetero atom-containing group; and these may be the same or different, and the adjacent groups of these may form a ring; the three $R^4$'s may be the same or different; and the three $R^8$'s may be the same or different; and
(B) a compound capable of reacting with the transition metal compound of the component (A) or its derivative to form an ionic complex;
and optionally (C) an organic aluminium compound.

(II) A polymerization catalyst comprising;
(A') a transition metal compound of a general formula (Ib):

$$CpM^2E^1E^2E^3 \qquad (Ib)$$

wherein
$M^2$ represents titanium, zirconium or hafnium;
Cp represents a cyclic compound group having a cyclopentadienyl or substituted cyclopentadienyl skeleton and having from 5 to 30 carbon atoms;
$E^1$, $E^2$ and $E^3$ each represent a σ-ligand, and these may be the same or different;
(B') a compound capable of reacting with the transition metal compound of the component (A') or its derivative to form an ionic complex; and
(D) a phenolic compound and/or water.

(III) A polymerization catalyst comprising;
(A') a transition metal compound of the above-mentioned general formula (Ib);

(B') a compound capable of reacting with the transition metal compound of the component (A') or its derivative to form an ionic complex; and
(E) (a) a reaction product of an organic aluminium compound and a phenolic compound and/or (b) a reaction product of an organic aluminium compound and a boron compound of a general formula (Ic):

(Ic)

wherein X, Y and D each represent a sulfur atom or an oxygen atom; and these may be the same or different.

The transition metal compound of the component (A) that constitutes the polymerization catalyst (I) has a structure to be represented by the general formula (Ia):

(Ia)

In formula (Ia), $M^1$ represents a metal element of the Group 3 to the Group 10 or the lanthanoid series in the Periodic Table, concretely including titanium, zirconium, hafnium, yttrium, vanadium, chromium, manganese, nickel, a cobalt, palladium, and lanthanoid series metals. Of these, preferred are the elements of the Group 4, such as titanium, zirconium and hafnium, for use in the polymerization catalyst for producing ethylenic copolymers. $X^1$ represents a ligand that bonds to $M^1$ via σ-bonding, and where the formula (Ia) has a plurality of $X^1$'s, said plural $X^1$'s may be the same or different, and the indenyl ring may be crosslinked with $Y^1$. Specific examples of $X^1$ include a hydrogen atom, a halogen atom, a hydrocarbon group having from 1 to 20 carbon atoms, an alkoxy group having from 1 to 20 carbon atoms, an aryloxy group having from 6 to 20 carbon atoms, an amido group having from 1 to 20 carbon atoms, a silicon-containing group having from 1 to 20 carbon atoms, a phosphido group having from 1 to 20 carbon atoms, a sulfido group having from 1 to 20 carbon atoms, an acyl group having from 1 to 20 carbon atoms, etc.

$Y^1$ represents a Lewis base, and where the formula (Ia) has a plurality of $Y^1$'s, said plural $Y^1$'s may be the same or different, and the indenyl ring may be crosslinked with $X^1$. $Y^1$ may be any of amines, ethers, phosphines and thioethers. Specific examples of $Y^1$ include ammonia; amines such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline, etc.; phosphines such as triethylphosphine, triphenylphosphine, diphenylphosphine, etc.; thioethers such as tetrahydrothiophene, etc.; esters such as ethyl benzoate, etc.; and nitrites such as acetonitrile, benzonitrile, etc.

A represents a crosslinking group, concretely having a structure of a formula, $(R'_n Q)$ in which Q represents an atom selected from the Groups 13, 14, 15 and 16; and n is 2 when Q is an atom of the Group 14, n is 1 when Q is an atom of the Group 13 or 15, and n is 0 when Q is an atom of the Group 16. Examples of the structure of the crosslinking group of A include $R'_2C$, $R'_2Si$, $R'_2Ge$, $R'_2Sn$, $R'Al$, $R'P$, $R'N$, oxygen (—O—), sulfur (—S—), selenium (—Se—), etc., in which R' represents a hydrogen atom, a halogen atom, a hydrocarbon group having from 1 to 20 carbon atoms, a halogen-containing hydrocarbon group having from 1 to 20 carbon atoms, a silicon-containing group, or a hetero atom-containing group, and when the structure has two R's, said two R's may be the same or different.

Examples of (A)p (where p represents an integer of from 1 to 20) include methylene, ethylene, ethylidene, isopropylidene, cyclohexylidene, 1,2-cyclohexylene, dimethylsilylene, tetramethyldisilylene, dimethylgermylene, dimethylstannylene, methylborylidene ($CH_3$—B=), methylalumylidene ($CH_3$—Al=), phenylphosphylidene (Ph—P=), phenylphosphoridene (PhPO=), ethylene (—CH=CH—), 1,2-phenylene, vinylene, vinylidene, ethenylidene ($CH_2$=C=), methylimido, oxygen (—O—), sulfur (—S—), selenium (—Se—), etc. Of these, preferred are methylene, ethylene, ethylidene and isopropylidene in view of the easiness and the high yield in the production of the transition metal compounds. q represents an integer of from 1 to 5 [(atomic valency of $M^1$)–2], and r represents an integer of from 0 to 3. $R^1$ to $R^8$ each represent a hydrogen atom, a halogen atom, a hydrocarbon group having from 1 to 20 carbon atoms, a halogen-containing hydrocarbon group having from 1 to 20 carbon atoms, a silicon-containing group, or a hetero atom-containing group; and these may be the same or different, and the adjacent groups of these may form a ring; the three $R^4$'s may be the same or different; and the three $R^8$'s may be the same or different.

Specific examples of R', and $R^1$ to $R^8$ include, in addition to a hydrogen atom, a halogen atom such as Cl, Br, F, I; a hydrocarbon group having from 1 to 20 carbon atoms, such as a methyl group, an ethyl group, an n-propyl group, an n-butyl group, an isopropyl group, an isobutyl group, an n-decyl group, etc.; a halogen-containing hydrocarbon group such as a trifluoromethyl group, etc.; a silicon-containing group such as a trimethylsilyl group, a dimethyl (t-butyl)silyl group, etc.; and a hetero atom-containing group such as a methoxy group, an ethoxy group, a dimethylamino group, etc.

Specific examples of the transition metal compounds of the above-mentioned general formula (Ia) include rac-[1,2-ethylenebis(7-(4-t-butylindenyl))]zirconium dichloride, rac-[1,2-ethylenebis(7-(4-methylindenyl))]zirconium dichloride, rac-[1,2-ethylenebis(7-(2,4-dimethylindenyl))]zirconium dichloride, rac-[1,2-ethylenebis(7-(1,4-dimethylindenyl))]zirconium dichloride, rac-[isopropylidenebis(7-(4-t-butylindenyl))]zirconium dichloride, rac-[isopropylidenebis(7-(4-methylindenyl))]zirconium dichloride, rac][isopropylidenebis(7-(2,4-dimethylindenyl))]zirconium dichloride, rac-[isopropylidenebis(7-(1,4-dimethylindenyl)]zirconium dichloride, rac-[methylenebis(7-(4-t-butylindenyl))]zirconium dichloride, rac-[methylenebis(7-(4-methylindenyl))]zirconium dichloride, rac-[methylenebis(7-(2,4-dimethylindenyl))]zirconium dichloride, rac-[methylenebis(7-(1,4-dimethylindenyl))]zirconium dichloride, rac-[1,2-ethylenebis(7-(2-phenyl-4-methylindenyl))]zirconium dichloride, rac-[isopropylidenebis(7-(2-phenyl-4-methylindenyl))] zirconium dichloride, rac-[methylenebis(7-(2-phenyl-4-methylindenyl))]zirconium dichloride, rac-[1,2-ethylenebis(7-(2-phenylindenyl))]zirconium dichloride, rac-[dimethylsilylenebis(7-(4-t-butylindenyl))]zirconium dichloride, rac-[dimethylsilylenebis(7-(4-methylindenyl))]zirconium dichloride, rac-[dimethylsilylenebis(7-(2,4-dimethylindenyl))]zirconium dichloride, rac-[1,2-ethylenebis(7-indenyl)]zirconium dichloride, rac-[trans-1,2-cyclohexylenebis(7-(4-t-butylindenyl)]zirconium dichloride, rac-[trans-1,2-cyclohexylenebis(7-(4-methylindenyl))]zirconium dichloride, rac-[trans-1,2-cyclohexylenebis(7-(2,4-dimethylindenyl))]zirconium dichloride, rac-[trans-1,2-cyclohexylenebis(7-(1,4-dimethylindenyl))]zirconium dichloride, rac-[1,2-ethylenebis(4-fluorenyl)]zirconium dichloride, rac-[1,2-ethylenebis(4-(1-methylfluorenyl))]zirconium dichloride; meso-substituents derived from these racemates; and titanium or hafnium substituents corresponding to these zirconium compounds. Needless-to-say, the transition metal compounds of formula (Ia) are not limited to those compounds mentioned above. Also employable herein are analogues to those mentioned above, which have a metal element of other Groups, such as a metal element of the lanthanoid series.

The transition metal compounds of the component (A) may be used either singly or as combined.

The component (B) that constitutes the polymerization catalyst (I) includes (B-1) an ionic compound capable of reacting with the transition metal compound of the component (A) to form an ionic complex, (B-2) an aluminoxane, and (B-3) a Lewis acid.

The ionic compound of the component (B-1) may be any and every one capable of reacting with the transition metal compound of the component (A) to form an ionic complex, but preferred are those of the following general formulae (II) and (III):

wherein $L^2$ represents $M^4$, $R^{10}R^{11}M^5$, $R^{12}{}_3C$ or $R^{13}M^5$. In these formulae (II) and (III), $L^1$ represents a Lewis base; $[Z]^-$ represents a non-coordinating anion, $[Z^1]^-$ or $[Z^2]^-$. $[Z^1]^-$ indicates an anion composed of a plurality of groups as bonded to an element, or that is, $[M^3G^1G^2 \ldots G^f]^-$, in which $M^3$ represents an element of the Groups 5 to 15 of the Periodic Table, preferably an element of the Groups 13 to 15 of the Periodic Table; and $G^1$ to $G^f$ each represent a hydrogen atom, a halogen atom, an alkyl group having from 1 to 20 carbon atoms, a dialkylamino group having from 2 to 40 carbon atoms, an alkoxy group having from 1 to 20 carbon atoms, an aryl group having from 6 to 20 carbon atoms, an aryloxy group having from 6 to 20 carbon atoms, an alkylaryl group having from 7 to 40 carbon atoms, an arylalkyl group having from 7 to 40 carbon atoms, a halogen-substituted hydrocarbon group having from 1 to 20 carbon atoms, an acyloxy group having from 1 to 20 carbon atoms, an organic metalloid group, or a hetero atom-containing hydrocarbon group having from 2 to 20 carbon atoms. Two or more of $G^1$ to $G^f$ may form a ring. f indicates an integer of [(atomic valency of the center metal, $M^3$)+1]. $[Z^2]^-$ indicates a conjugate base of a single Brønsted acid of which the logarithmic number of the reciprocal of the acid dissociation constant (pKa) is not larger than –10, or a conjugate base of a combination of such a Brønsted acid and a Lewis acid, or a conjugate base of a so-called ultra-strong acid. This may be coordinated with a Lewis acid. $R^9$ represents a hydrogen atom, an alkyl group having from 1 to 20 carbon atoms, an aryl group having from 6 to 20 carbon atoms, an alkylaryl group, or an arylalkyl group. $R^{10}$ and $R^{11}$ each represent a cyclopentadienyl group, a substituted cyclopentadienyl group, an indenyl group, or a fluorenyl group. $R^{12}$ represents an alkyl group having from 1 to 20 carbon atoms, an aryl group, an alkylaryl group, or an arylalkyl group. $R^{13}$ represents a macro-cyclic ligand, such as tetraphenylporphyrin, phthalocyanine or the like. k indicates the ionic valency of $[L^1-R^9]$ and $[L^2]$, and is an integer of from 1 to 3; a is an integer of 1 or more; and b=(k×a). $M^4$ includes elements of the Groups 1 to 3, 11 to 13 and 17 of the Periodic Table; and $M^5$ indicates an element of the Groups 7 to 12 of the Periodic Table.

Specific examples of $L^1$ include ammonia; amines such as methylamine, aniline, dimethylamine, diethylamine, N-methylaniline, diphenylamine, N,N-dimethylaniline, trimetylamine, triethylamine, tri-n-butylamine, methyldiphenylamine, pyridine, p-bromo-N,N-dimethylaniline, p-nitro-N,N-dimethylaniline, etc.; phosphines such as triethylphosphine, triphenylphosphine, diphenylphosphine, etc.; thioethers such as tetrahydrothiophene, etc.; esters such as ethyl benzoate, etc.; and nitriles such as acetonitrile, benzonitrile, etc.

Specific examples of $R^9$ include a hydrogen atom, a methyl group, an ethyl group, a benzyl group, a trityl group, etc.; and specific examples of $R^{10}$ and $R^{11}$ include a cyclopentadienyl group, a methylcyclopentadienyl group, an ethylcyclopentadienyl group, a pentamethylcyclopentadienyl group, etc. Specific examples of $R^{12}$ include a phenyl group, a p-tolyl group, a p-methoxyphenyl group, etc. Specific examples of $R^{13}$ include a tetraphenylporphine group, a phthalocyanine group, an allyl group, a methallyl group, etc. Specific examples of $R^{14}$ include Li, Na, K, Ag, Cu, Br, I, $I_3$, etc. Specific examples of $R^{15}$ include Mn, Fe, Co, Ni, Zn, etc.

In $[M^3G^1G^2 \ldots G^f]$ of $[Z^1]^-$, $M^3$ includes, for example, B, Al, Si, P, As, Sb, etc. Preferred are B and Al. Specific examples of $G^1$ and $G^2$ to $G^f$ include a dialkylamino group such as a dimethylamino group, a diethylamino group, etc.; an alkoxy or aryloxy group such as a methoxy group, an ethoxy group, an n-butoxy group, a phenoxy group, etc.; a hydrocarbon group such as a methyl group, an ethyl group, an n-propyl group, an isopropyl group, an n-butyl group, an isobutyl group, an n-octyl group, an n-eicosyl group, a phenyl group, a p-tolyl group, a benzyl group, a 4-t-butylphenyl group, a 3,5-dimethylphenyl group, etc.; a halogen atom such as fluorine, chlorine, bromine, iodine; a hetero atom-containing hydrocarbon group such as a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, a bis(trimethylsilyl)methyl group, etc.; and an organic metalloid group such as a pentamethylantimonyl group, a trimethylsilyl group, a trimethylgermyl group, a diphenylarsenyl group, a dicyclohexylantimonyl group, a diphenylboryl group, etc.

Specific examples of the non-coordinating anion, $[Z^2]^-$ which is a single Brønsted acid having a pKa of not larger than −10 or a combination of such a Brønsted acid and a Lewis acid, include trifluoromethanesulfonate anion $(CF_3SO_3)^-$, bis(trifluoromethanesulfonyl)methyl anion, bis(trifluoromethanesulfonyl)benzyl anion, bis(trifluoromethanesulfonyl)amide, perchlorate anion $(ClO_4)^-$, trifluoroacetate anion $(CF_3CO_2)^-$, hexafluoroantimonyl anion $(SbF_6)^-$, fluorosulfonate anion $(FSO_3)^-$, chlorosulfonate anion $(ClSO_3)^-$, fluorosulfonate anion/5-fluoroantimony $(FSO_3/SbF_5)^-$, fluorosulfonate anion/5-fluoroarsenic $(FSO_3/AsF_5)^-$, trifluoromethanesulfonate/5-fluoroantimony $(CF_3SO_3/SbF_5)^-$, etc.

Specific examples of the compound of the component (B-1), or that is, the ionic compound capable of reacting with the transition metal compound of the component (A) to form an ionic complex include triethylammonium tetraphenylborate, tri-n-butylaluminium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl (tri-n-butyl) ammonium tetrakis (pentafluorophenyl)borate, methyldiphenylammonium tetrakis (pentafluorophenyl)borate, triphenyl(methyl) ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrin manganese tetraphenylborate, ferrocenium tetrakis(pentafluorophenyl)borate, (1,1'-dimethylferrocenium) tetrakis (pentafluorophenyl)borate, decamethylferrocenium tetrakis (pentafluorophenyl)borate, silver tetrakis (pentafluorophenyl)borate, trityl tetrakis(pentafluorophenyl)borate, lithium tetrakis(pentafluorophenyl)borate, sodium tetrakis(pentafluorophenyl)borate, tetraphenylporphyrin manganese tetrakis(pentafluorophenyl)borate, silver tetrafluoroborate, silver hexafluorophosphate, silver hexafluoroarsenate, silver trifluoroacetate, silver trifluoromethanesulfonate, etc.

These ionic compounds of the component (B-1) capable of reacting with the transition metal compound of the component (A) to form an ionic complex can be used either singly or as combined.

On the other hand, the aluminoxane of the component (B-2) includes linear aluminoxanes of a general formula (IV):

wherein
$R^{14}$ represents a hydrocarbon groups such as an alkyl group having from 1 to 20, preferably from 1 to 12 carbon atoms, an alkenyl group, an aryl group, an arylalkyl group or the like, or a halogen atom;

w represents the degree of polymerization of the compound, and is generally an integer of from 3 to 50, preferably from 7 to 40; and $R^{14}$'s may be the same or different;

and cyclic aluminoxanes of a general formula (V):

(V)

wherein $R^{14}$ and w have the same meanings as above.

To produce the above-mentioned aluminoxanes, for example, employable is any method of contacting an alkyl aluminium with a condensing agent such as water or the like, for which the means is not specifically defined, and the reaction may be effected in any ordinary manner. For example, for the reaction, employable are (1) a method of dissolving an organic aluminium compound in an organic solvent followed by contacting the resulting solution with water; (2) a method of initially adding an organic aluminium compound to the polymerization system, and thereafter adding water thereto; (3) a method of reacting an organic aluminium compound with crystal water existing in metal salts or the like, or with water adsorbed by and existing in inorganic or organic substances; and (4) a method of reacting a tetraalkyldialuminoxane with a trialkyl aluminium and then with water. The aluminoxanes may be insoluble in toluene.

These aluminoxanes can be used either singly or as combined.

The Lewis acid of the component (B-3) is not specifically defined, and may be an organic compound or a solid inorganic compound. The organic compound is preferably a boron compound or an aluminium compound; and the inorganic compound is preferably a magnesium compound or an aluminium compound. The aluminium compound includes, for example, aluminium oxide, aluminium chloride, etc.; the magnesium compound includes, for example, magnesium chloride, diethoxymagnesium, etc.; the boron compound includes, for example, triphenylboron, tris(pentafluorophenyl)boron, tris[3,5-bis(trifluoromethyl)phenyl]boron, tris[(4-fluoromethyl)phenyl]boron, trimethylboron, triethylboron, tri-n-butylboron, tris(fluoromethyl)boron, tris(pentafluoroethyl)boron, tris(nonafluorobutyl)boron, tris(2,4,6-trifluorophenyl)boron, tris(3,5-difluorophenyl)boron, tris[3,5-bis(trifluoromethyl)phenyl]boron, bis(pentafluorophenyl)fluoroboron, diphenylfluoroboron, bis(pentafluorophenyl)chloroboron, dimethylfluoroboron, diethylfluoroboron, di-n-butylfluoroboron, pentafluorophenyldifluoroboron, phenyldifluoroboron, pentafluorophenyldichloroboron, methyldifluoroboron, ethyldifluoroboron, n-butyldifluoroboron, etc.

These Lewis acids can be used either singly or as combined.

In the polymerization catalyst (I), the ratio of the component (A) to the component (B) is preferably from 10/1 to 1/100, more preferably from 2/1 to 1/10, by mol, where the component (B) is the compound (B-1). Where the component (B) is the compound (B-2), said ratio is preferably from 1/1 to 1/1000000, more preferably from 1/10 to 1/10000, by mol.

The ratio of the component (A) to the component (B-3) is preferably from 1/0.1 to 1/2000, more preferably from 1/0.2 to 111000, even more preferably from 1/0.5 to 1/500, by mol. The component (B) may comprise any of (B-1), (B-2) and (B-3) either singly or as combined.

The polymerization catalyst (I) may consist essentially of the above-mentioned components (A) and (B), or essentially of the components (A) and (B) and an organic aluminium compound of the component (C).

The organic aluminium compound of the component (C) is, for example, a compound of a general formula (VI):

(VI)

wherein $R^{15}$ represents a hydrocarbon group having from 1 to 20 carbon atoms, preferably an alkyl group having from 1 to 10 carbon atoms;

J represents a hydrogen atom, an alkoxy group having from 1 to 20 carbon atoms, an aryl group having from 6 to 20 carbon atoms, or a halogen atom; and v represents an integer of from 1 to 3.

Specific examples of the compound of formula (VI) include trimethylaluminium, triethylaluminium, triisopropylaluminium triisobutylaluminium, dimethylaluminium chloride, diethylaluminium chloride, methylaluminium dichloride, ethylaluminium dichloride, dimethylaluminium fluoride, diisobutylaluminium hydride, diethylaluminium hydride, ethylaluminium sesqui-chloride, etc.

These organic aluminium compounds may be used either singly or as combined.

The ratio of the component (A) to the component (C) is preferably from 1/1 to 1/10000, more preferably from 1/5 to 1/2000, even more preferably from 1/10 to 1/1000, by mol. The catalyst comprising the component (C) is advantageous in that its catalytic activity to catalyze polymerization, relative to the transition metal constituting it, is improved. However, if the catalyst contains too much of the component (C) of an organic aluminium compound, the excess organic aluminium compound is of no use any more and much of it unfavorably remains in the polymer formed.

At least one component of the polymerization catalyst (I) can be held on a suitable carrier. The type of the carrier is not specifically defined. For example, the carrier may be any of inorganic oxide carriers, or other inorganic or organic carriers. Especially preferred are inorganic oxide carriers or other inorganic carriers.

Inorganic oxide carriers include, for example, $SiO_2$, $Al_2O_3$, MgO, $ZrO_2$, $TiO_2$, $Fe_2O_3$, $B_2O_3$, CaO, ZnO, BaO, $ThO_2$, and their mixtures such as silica-alumina, zeolite, ferrite, glass fiber, etc. Of these, preferred are $SiO_2$ and $Al_2O_3$. These inorganic oxide carriers may contain a small amount of carbonates, nitrates, sulfates or the like.

The others than the above-mentioned examples of the carrier include magnesium compounds to be represented by a general formula, $MgR^{16}_xX^2_y$, such as $MgCl_2$ and $Mg(OC_2H_5)_2$, and their complexes. In said formula, $R^{16}$ represents an alkyl group having from 1 to 20 carbon atoms, an alkoxy group having from 1 to 20 carbon atoms, or an aryl group having from 6 to 20 carbon atoms; $X^2$ represents a halogen atom, or an alkyl group having from 1 to 20 carbon atoms; x is from 0 to 2; y is from 0 to 2; and x+y=2. A plurality of $R^{16}$'s and $X^2$'s, if any, may be the same or different.

The organic carrier includes, for example, polymers such as polystyrenes, styrene-divinylbenzene copolymers, polyethylenes, polypropylenes, substituted polystyrenes, polyarylates, etc.; and starch, carbon, etc.

As the carrier for use in the present invention, preferred are $MgCl_2$, $MgCl(OC_2H_5)$, $Mg(OC_2H_5)_2$, $SiO_2$, $Al_2O_3$, etc. The morphology of the carrier varies, depending on its type and the method for producing it. In general, the mean particle size of the carrier may be from 1 to 300 μm, preferably from 10 to 200 μm, more preferably from 20 to 100 μm.

If the particle size of the carrier used is too small, the amount of fine powder to be in the polymer formed increases; but if it is too large, the amount of large particles to be in the polymer formed increases, thereby lowering the bulk density of the polymer formed or clogging the hopper being used for polymerization.

The specific surface area of the carrier for use in the invention is generally from 1 to 1000 m2/g, preferably from 50 to 500 m2/g; and the pore capacity thereof is generally from 0.1 to 5 cm³/g, preferably from 0.3 to 3 cm³/g.

If either the specific surface area or the pore capacity of the carrier oversteps the above-defined range, the carrier will often lower the activity of the catalyst held on it. The specific surface area and the pore capacity of the carrier can be obtained, for example, according to the BET method in which the volume of nitrogen gas absorbed by the carrier is measured (see Journal of the American Chemical Society, Vol. 60, p. 309, 1983).

It is desirable that the carrier is calcined generally at from 150 to 1000° C., but preferably at from 200 to 800° C., before using it.

When at least one catalyst component is held on the above-mentioned carrier, it is desirable to make the carrier carry at least one of the component (A) and the component (B), preferably both the component (A) and the component (B).

The means of making the carrier carry at least one of the component (A) and the component (B) is not specifically defined. For this, for example, employable is any of (1) a method of mixing at least one of the component (A) and the component (B) with a carrier; (2) a method of processing a carrier with an organic aluminium compound followed by mixing it with at least one of the component (A) and the component (B) in an inert solvent; (3) a method of reacting a carrier, the component (A) and/or the component (B), and an organic aluminium compound all at a time; (4) a method of making a carrier carry the component (A) or (B), followed by mixing it with the component (B) or (A); (5) a method of mixing a catalytic reaction product of the component (A) and the component (B) with a carrier; and (6) a method catalytically reacting the component (A) and the component (B) in the presence of a carrier.

In the above-mentioned methods (4), (5) and (6), an organic aluminium compound of the component (C) may be added to the reaction system.

The catalyst thus obtained may be subjected to distillation to remove the solvent therefrom, and the thus-isolated solid catalyst may be used for the polymerization in the present invention; or alternatively, it may be directly used for the polymerization.

In the present invention, if desired, the step of making the carrier carry at least one of the component (A) and the component (B) may be effected in a polymerization system to form the intended catalyst. For example, for this, at least one of the component (A) and the component (B), and a carrier, and optionally an organic aluminium compound of the component (C) are put into a reactor, to which is added an olefin such as ethylene at ordinary pressure or under pressure of up to 20 kg/cm², and the monomer is pre-polymerized at from -20° C. to 200° C. for from 1 minute to 2 hours to form catalyst particles.

Preferably, the ratio of the component (B-1) to the carrier is from 1/5 to 1/10000, more preferably from 1/10 to 1/500, by weight. The ratio of the component (B-2) to the carrier is preferably from 1/0.5 to 1/1000, more preferably from 1/1 to 1/50, by weight. The ratio of the component (B-3) to the carrier is preferably from 1/5 to 1/10000, more preferably from 1/10 to 1/500, by weight. Where the component (B) is comprised of two or more constitutive compounds, it is desirable that the ratio by weight of each constitutive component to the carrier falls within the above-defined range. The ratio of the component (A) to the carrier is preferably from 1/5 to 1/10000, more preferably from 1/10 to 1/500, by weight.

If the ratio of the component (B) [that is, the component (B-1), (B-2) or (B-3)] to the carrier, or that of the component (A) to the carrier oversteps the above-defined range, the activity of the resulting catalyst will often be poor. The polymerization catalyst (I) thus prepared in the manner mentioned hereinabove has a mean particle size of generally from 2 to 200 μm, preferably from 10 to 150 μm, more preferably from 20 to 100 μm, and has a specific surface area of generally from 20 to 1000 m²/g, preferably from 50 to 500 m²/g. If the catalyst having a mean particle size of smaller than 2 μm is used, the polymer formed will have an increased amount of fine powder; but if the catalyst having a mean particle size of larger than 200 μm is used, the polymer will have an increased amount of large particles. If the catalyst has a specific surface area of smaller than 20 m²/g, its activity is low; but if the catalyst having a specific surface area of larger than 1000 m²/g is used, the bulk density of the polymer formed will be low. In the polymerization catalyst (I), it is desirable that the amount of the transition metal to be in 100 g of the carrier is generally from 0.05 to 10 g, preferably from 0.1 to 2 g. If the transition metal content of the catalyst oversteps the above-defined range, the activity of the catalyst will be poor.

Using the catalyst thus held on a carrier such as that mentioned hereinabove, the copolymers of the invention obtained are industrially advantageous in that they have a desired high bulk density and have a desired particle size distribution.

Now, the polymerization catalyst (II) for use in the present invention is referred to. The transition metal compound to be in the catalyst (II) as the component (A') is represented by a general formula (Ib):

$$CpM^2E^1E^2E^3 \qquad (Ib).$$

In formula (Ib), $M^2$ represents titanium, zirconium or hafnium. Especially preferably, $M^2$ is titanium. Cp represents a cyclic compound group having a cyclopentadienyl or substituted cyclopentadienyl skeleton and having from 5 to 30 carbon atoms, and this bonds to $M^2$ in a $\eta^5$-bonding mode via π-bonding therebetween. $E^1$, $E^2$ and $E^3$ each represent a σ-ligand, which coordinates with $M^2$ via σ-bonding therebetween. Preferred examples of the σ-ligand include R", OR", SR", SO₃R", NR"R'", PR"R'", NO₂, a halogen atom, a 1-pyrrolyl group, and a 1-pyrrolidinyl group. In these, R" and R'"each represent a hydrocarbon group having from 1 to 20 carbon atoms, or a silyl group comprising such a hydrocarbon group. Preferably, at least one σ-ligand in the formula is any of a halogen atom, OR", NR"R'" or PR"R'". $E^1$, $E^2$ and $E^3$ may be the same or different.

The compound of formula (Ib) has one Cp, which is a residue of a cyclic compound having a cyclopentadienyl or substituted cyclopentadienyl skeleton and having from 5 to 30 carbon atoms, and bonding to $M^2$ in a $\eta^5$-bonding mode via π-bonding therebetween. In this, the substituents existing on the substituted cyclopentadienyl skeleton may be bonded to each other to form an additional cyclic structure. Accordingly, groups having any of indenyl, substituted indenyl, fluorenyl and substituted fluorenyl skeletons are within the scope of the cyclic compound residue of Cp.

For R″ and R‴, the hydrocarbon group having from 1 to 20 carbon atoms includes, for example, an alkyl group, a cycloalkyl group, an aryl group, an aralkyl group, etc. The alkyl group includes, for example, a methyl group, an ethyl group, an n-propyl group, an isopropyl group, an n-butyl group, an isobutyl group, a sec-butyl group, a t-butyl group, a pentyl group, a hexyl group, an octyl group, a decyl group, a dodecyl group, etc. The cycloalkyl group includes, for example, a cyclopentyl group, a cyclohexyl group, etc. The aryl group includes, for example, a phenyl group, a tolyl group, etc. The aralkyl group includes, for example, a benzyl group, a phenethyl group, etc. The silyl group comprising a hydrocarbon group includes, for example, a trimethylsilyl group, a triphenylsilyl group, etc. Specific examples of OR″ include an alkoxy group such as a methoxy group, an ethoxy group, an n-propoxy group, an isopropoxy group, an n-butoxy group, an isobutoxy group, a sec-butoxy group, a t-butoxy group, a pentoxy group, a hexoxy group, an octoxy group, a cyclohexoxy group, etc.; and an aryloxy group such as a phenoxy group, etc. Specific examples of SR″ include a methylthio group, an ethylthio group, a cyclohexylthio group, a phenylthio group, etc. Specific examples of $SO_3R″$ include an alkylsulfonyl group such as a methanesulfonyl group, an ethanesulfonyl group, an propanesulfonyl group, an isopropanesulfonyl group, an n-butanesulfonyl group, a sec-butanesulfonyl group, a t-butanesulfonyl group, an isobutanesulfonyl group, etc.; and an arylsulfonyl group such as a benzenesulfonyl group. Specific examples of NR″R‴ include a dimethylamino group, a diethylamino group, a di(n-propyl)amino group, a diisopropylamino group, a di(n-butyl)amino group, a diisobutylamino group, di(sec-butyl)amino group, a di(t-butyl)amino group, a dipentylamino group, a dihexylamino group, a dioctylamino group, a diphenylamino group, a dibenzylamino group, a methylethylamino group, a (t-butyl)trimethylsilylamino group, a methyltrimethylsilylamino group, etc. Specific examples of PR″R‴ include a dimethylphosphide group, a diethylphosphide group, a di(n-propyl)phosphide group, a diisopropylphosphide group, a di(n-butyl)phosphide group, a diisobutylphosphide group, a di(sec-butyl)phosphide group, a di(t-butyl)phosphide group, a dipentylphosphide group, a dihexylphosphide group, a dioctylphosphide group, a diphenylphosphide group, a dibenzylphosphide group, a methylethylphosphide group, a (t-butyl)trimethylsilylphosphide group, a methyltrimethylsilylphosphide group, etc. The halogen atom includes fluorine, chlorine, bromine and iodine atoms.

The transition metal compound of the above-mentioned formula (Ib) includes, for example, cyclopentadienyltitanium-trimethyl, cyclopentadienyltitanium-triethyl, cyclopentadienyltitanium-tri(n-propyl), cyclopentadienyltitanium-triisopropyl, cyclopentadienyltitanium-tri(n-butyl), cyclopentadienyltitanium-triisobutyl, cyclopentadienyltitanium-tri(sec-butyl), cyclopentadienyltitanium-tri(t-butyl, methylcyclopentadienyltitanium-trimethyl, 1,2-dimethylcyclopentadienyltitanium-trimethyl, 1,2,4-trimethylcyclopentadienyltitanium-trimethyl, 1,2,3,4-tetramethylcyclopentadienyltitanium-trimethyl, pentamethylcyclopentadienyltitanium-trimethyl, pentamethylcyclopentadienyltitanium-triethyl, pentamethylcyclopentadienyltitanim-tri(n-propyl), pentamethylcyclopentadienyltitanium-triisopropyl, pentamethylcyclopentadienyltitanium-tri(n-butyl), pentamethylcyclopentadienyltitanium-triisobutyl, pentamethylcyclopentadienyltitanium-tri(sec-butyl), pentamethylcyclopentadienyltitanium-tri(t-butyl), cyclopentadienyltitanium trimethoxide, cyclopentadienyltitanium triethoxide, cyclopentadienyltitanim tri(n-propoxide), cyclopentadienyltitanium triisopropoxide, cyclopentadienyltitanium triphenoxide, methylcyclopentadienyltitanium trimethoxide, (n-butyl)cyclopentadienyltitanium trimethoxide, dimethylcyclopentadienyltitanium trimethoxide, dimethylcyclopendatienyltitanium triethoxide, dimethylcyclopentadienyltitanium tri(n-propoxide), dimethylcyclopentadienyltitanium trisopropoxide, dimethylcyclopentadienyltitanium tripheroxide, di(t-butyl)cyclopentadienyltitanium trimethoxide, di(t-butyl)cyclopentadienyltitanium triethoxide, di(t-butyl)cyclopentadienyltitanium tri(n-propoxide), di(t-butyl)cyclopentadienyltitanium triisopropoxide, di(t-butyl)cyclopentadienyltitanium triphenoxide, bis(trimethylsilyl)cyclopentadienyltitanium trimethoxide, bis(trimethylsilyl)cyclopentadienyltitanium triethoxide, bis(trimethylsilyl)cyclopentadienyltitanium tri (n-propoxide), bis(trimethylsilyl)cyclopentadienyltitanium triisopropoxide, bis(trimethylsilyl)cyclopentadienyltitanium triphenoxide, trimethylcyclopentadienyltitanium trimethoxide, trimethylcyclopentadienyltitanium triethoxide, trimethylcyclopentadienyltitanium tri(n-propoxide), trimethylcyclopentadienyltitanium triisopropoxide, trimethylcyclopentadienyltitanium triphenoxide, triethylcyclopentadienyltitanium trimethoxide, [bis (dimethylsilyl), methyl]cyclopentadienyltitanium trimethoxide, [di(t-butyl, methyl]cyclopentadienyltitanium triethoxide, tetramethylcyclopentadienyltitanium trimethoxide, tetramethylcyclopentadienyltitanium triethoxide, tetramethylcyclopentadienyltitanium tri(n-propoxide), tetramethylcyclopentadienyltitanium trisopropoxide, tetramethylcyclopentadienyltitanium tri(n-butoxide), tetramethylcyclopentadienyltitanium trisobutoxide, tetramethylcyclopentadienyltitanium tri(sec-butoxide), tetramethylcyclopentadienyltitanium tri(t-butoxide), tetramethylcyclopentadienyltitanium triphenoxide, [tetramethyl, 4-methoxyphenyl]cyclopentadienyltitanium trimethoxide, [tetramethyl, 4-methoxyphenyl]cyclopentadienyltitanium triethoxide, [tetramethyl, 4-methoxyphenyl] cyclopentadienyltitanium (n-propoxide), [tetramethyl, 4-methoxyphenyl]cyclopentadienyltitanium triisopropoxide, [tetramethyl, 4-methoxyphenyl] cyclopentadienyltitanium triphenoxide, [tetramethyl, 4-methylphenyl]cyclopentadienyltitanium trimethoxide, [tetramethyl, 4-methylphenyl]cyclopentadienyltitanium triethoxide, [tetramethyl, 4-methylphenyl] cyclopentadienyltitanium tri(n-propoxide, [tetramethyl, 4-methylphenyl]cyclopentadienyltitanium triisopropoxide, [tetramethyl, 4-methylphenyl]cyclopentadienyltitanium triphenoxide, [tetramethyl, benzyl]cyclopentadienyltitanium trimethoxide, [tetramethyl, benzyl] cyclopentadienyltitanium triethoxide, [tetramethyl, benzyl] cyclopentadienyltitanium tri(n-propoxide, [tetramethyl, benzyl]cyclopentadienyltitanium triisopropoxide, [tetramethyl, benzyl]cyclopentadienyltitanium triphenoxide, [tetramethyl, 2-methoxyphenyl]cyclopentadienyltitanium trimethoxide, [tetramethyl, 2-methoxyphenyl] cyclopentadienyltitanium triethoxide, [tetramethyl, 2-methoxyphenyl]cyclopentadienyltitanium triphenoxide, [tetramethyl, ethyl]cyclopentadienyltitanium trimethoxide, [tetramethyl, ethyl]cyclopentadienyltitanium triethoxide,

[tetramethyl, ethyl]cyclopentadienyltitanium tri(n-propoxide, [tetramethyl, ethyl]cyclopentadienyltitanium triisopropoxide, [tetramethyl, ethyl]cyclopentadienyltitanium triphenoxide, [tetramethyl, n-butyl]cyclopentadienyltitanium trimethoxide, [tetramethyl, n-butyl]cyclopentadienyltitanium triethoxide, [tetramethyl, n-butyl]cyclopentadienyltitanium tri(n-propoxide), [tetramethyl, n-butyl]cyclopentadienyltitanium triisopropoxide, [tetramethyl, n-butyl]cyclopentadienyltitanium triphenoxide, [tetramethyl, phenyl]cyclopentadienyltitanium trimethoxide, [tetramethyl, phenyl]cyclopentadienyltitanium triethoxide, [tetramethyl, phenyl]cyclopentadienyltitanium triphenoxide, [tetramethyl, trimethylsilyl]cyclopentadienyltitanium trimethoxide, [tetramethyl, trimethylsilyl]cyclopentadienyltitanium triphenoxide, pentamethylcyclopentadienyltitanium trimethoxide, pentamethylcyclopentadienyltitanium triethoxide, pentamethylcyclopentadienyltitanium tri(n-propoxide), pentamethylcyclopentadienyltitanium triisopropoxide, pentamethylcyclopentadienyltitanium tri(n-butoxide), pentamethylcyclopentadienyltitanium triisobutoxide, pentamethylcyclopentadienyltitanium tri(sec-butoxide), pentamethylcyclopentadienyltitanium tri(t-butoxide), pentamethylcyclopentadienyltitanium tri(cyclohexoxide), pentamethylcyclopentadienyltitanium triphenoxide, cyclopentadienyltitanium-tribenzyl, indenyltitanium trimethoxide, indenyltitanium triethoxide, indenyltitanium-trimethyl, indenyltitanium-tribenzyl, cyclopentadienyltitanium-tri(methanesulfonyl), trimethylcyclopentadienyltitanium-(tribenzenesulfonyl), tetramethylcyclopentadienyltitanium-tri(ethanesulfonyl), pentamethylcyclopentadienyltitanium-tri(methanesulfonyl), cyclopentadienyltitanium-tris(dimethylamide), trimethylcyclopentadienyltitanium-tris(dimethylamide), pentamethylcyclopentadienyltitanium-tris(dibenzylamide), pentamethylcyclopentadienyltitanium-tris(dimethylamide), pentamethylcyclopentadienyltitanium-tris(diethylamide), cyclopentadienyltitanium-tri(nitro), pentamethylcyclopentadienyltitanium-tri(nitro), etc.; and compounds that correspond to the above-mentioned ones but differ from the latter in that the former have zirconium or hafnium in place of titanium.

Additional examples of the transition metal compound of formula (Ib) include cyclopentadienyltitanium dimethylmonochloride, cyclopentadienyltitanium monoethyldichloride, cyclopentadienyltitanium di(n-propyl)monochloride, cyclopentadienyltitanium diisopropylmonochloride, cyclopentadienyltitanium di(n-butyl)monochloride, cyclopentadienyltitanium diisobutylmonochloride, cyclopentadienyltitanium di(sec-butyl)monochloride, cyclopentadienyltitaniumn di(t-butyl)monochloride, 1,2-dimethylcyclopentadienyltitanium dimethylmonochloride, 1,2,4-trimethylcyclopentadienyltitanium dimethylmonochloride, 1,2,3,4-tetramethylcyclopentadienyltitanium dimethylmonochloride, pentamethylcyclopentadienyltitanium dimethylmonochloride, cyclopentadienyltitanium monochlorodimethoxide, cyclopentadienyltitanium dichloromonomethoxide, cyclopentadienyltitanium dichloromonoethoxide, cyclopentadienyltitanium monochlorodi(n-propoxide), cyclopentadienyltitanium monochlorodiisopropoxide, cyclopentadienyltitanium monochlorodiphenoxide, dimethylcyclopentadienyltitanium mochlorodimethoxide, dimethylcyclopentadienyltitanium monochlorodiethoxide, dimethylcyclopentadienyltitanium monochlorodi(n-propoxide), dimethylcyclopentadienyltitanium monochlorodiisopropoxide, dimethylcyclopentadienyltitanium monochlorodiphenoxide, di(t-butyl)cyclopentadienyltitanium monochlorodimethoxide, bis(trimethylsilyl)cyclopentadienyltitanium monochlorodimethoxide, trimethylcyclopentadienyltitanium monochlorodimethoxide, trimethylcyclopentadienyltitanium monochlorodiphenoxide, triethylcyclopentadienyltitanium monochlorodimethoxide, [bis(dimethylsilyl), methyl]cyclopentadienyltitanium monochlorodimethoxide, tetramethylcyclopentadienyltitanium monochlorodimethoxide, tetramethylcyclopentadienyltitanium dichloromonomethoxide, tetramethylcyclopentadienyltitanium monochlorodi(n-butoxide), tetramethylcyclopentadienyltitanium monochlorodiisobutoxide, tetramethylcyclopentadienyltitanium monochlorodi(sec-butoxide), tetramethylcyclopentadienyltitanium monochlorodi(t-butoxide), [tetramethyl, 4-methoxyphenyl]cyclopentadienyltitanium monochlorodimethoxide, [tetramethyl, 4-methylphenyl]cyclopentadienyltitanium monochlorodimethoxide, [tetramethyl, benzyl]cyclopentadienyltitanium monochlorodimethoxide, [tetramethyl, benzyl]cyclopentadienyltitanium monochlorodiphenoxide, [tetramethyl, 2-methoxyphenyl]cyclopentadienyltitanium monochlorodimethoxide, [tetramethyl, ethyl]cyclopentadienyltitanium monochlorodimethoxide, [tetramethyl, ethyl]cyclopentadienyltitanium monochlorodiethoxide, [tetramethyl, n-butyl]cyclopentadienyltitanium monochlorodiethoxide, [tetramethyl, n-butyl]cyclopentadienyltitanium monochlorodi(n-propoxide), [tetramethyl, n-butyl]cyclopentadienyltitanium monochlorodiisopropoxide, [tetramethyl, phenyl]cyclopentadienyltitanium monochlorodimethoxide, [tetramethyl, trimethylsilyl]cyclopentadienyltitanium monochlorodimethoxide, pentamethylcyclopentadienyltitanium monochlorodimethoxide, pentamethylcyclopentadienyltitanium dichloromonomethoxide, pentamethylcyclopentadienyltitanium monochlorodiethoxide, pentamethylcyclopentadienyltitanium monochlorodi(cyclohexoxide), pentamethylcyclopentadienyltitanium monochlorodiphenoxide, indenyltitanium monochlorodimethoxide, cyclopentadienyltitanium-monochlorodi(methanesulfonyl), pentamethylcyclopentadienyltitanium monochlorobis(diethylamide), pentamethylcyclopentadienyltitanium monochlorobis[di(n-butyl)amide], pentamethylcyclopentadienyltitanium dichloro(dimethylamide), pentamethylcyclopentadienyltitanium dichloro(diphenylamide), pentamethylcyclopentadienyltitanium dichloro(methylethylamide), pentamethylcyclopentadienyltitanium dichloro(t-butyltrimethylsilylamide), pentamethylcyclopentadienyltitanium dimethoxy(diphenylamide), pentamethylcyclopentadienyltitanium monochlorobis(diethylphosphide), pentamethylcyclopentadienyltitanium monochlorobis[di(n-butyl)phosphide], pentamethylcyclopentadienyltitanium dichloro(dimethylphosphide), pentamethylcyclopentadienyltitanium dimethoxy(dimethylphosphide), pentamethylcyclopentadienyltitanium dichloro(diphenylphosphide), pentamethylcyclopentadienyltitanium dichloro(methylethylphosphide), pentamethylcyclopentadienyltitanium dichloro(t-butyltrimethylsilylphosphide), pentamethylcyclopentadienyltitanium dimethoxy(diphenylphosphide), cyclopentadienyltitanium trichloride, n-butylcyclopentadienyltitanium trichloride, tetramethylcylopentadienyltitanium trichoride, pentamethylcyclopentadienyltitanium trichloride, pentaethylcyclopentadienyltitanium trichloride, [tetramethyl, n-butyl]cyclopentadienyltitanium trichloride, tetraisobutyl-cyclopentadienyltitanium trichloride, tetraphenylcyclopentadienyltitanium trichloride, norbornacyclopentadienyltitanium trichloride, indenyltitanium trichloride, 4,5,6,7-tetrahydroindenyl trichloride, [1,2,3-trimethyl, 4,5,6,7-tetrahydro]indenyltitanium trichloride, [1,2,3,4,5,6,7-heptamethyl]indenyltitanium trichloride, pentamethylcyclopentadienyltitanium trifluoride, pentamethylcyclopentadienyltitanium tribromide, pentamethylcyclopentadienyltitanium triiodide; and compounds that correspond to the above-mentioned ones but differ from the latter in that the former have zirconium or hafnium in place of titanium.

In the polymerization catalyst (II), one or more of such transition metal compounds may constitute the component (A').

The component (B') to be in the polymerization catalyst (II) includes a compound capable of reacting with the transition metal compound of the component (A') to form an ionic complex, as well as an aluminoxane and a Lewis acid. The component (B') may be the same as the component (B) to be in the polymerization catalyst (I) mentioned hereinabove. The component (B') may be comprised of one or more of such compounds, but is preferably an aluminoxane.

In the polymerization catalyst (II), the ratio of the component (A') to the component (B') may be the same as that of the component (A) to the component (B') in the polymerization catalyst (I).

The polymerization catalyst (II) may additionally contain the component (D) of a phenolic compound and/or water, whereby its activity can be further improved. The component (D) is preferably a phenolic compound. The phenolic compound includes, for example, aromatic compounds in which at least one hydrogen atom bonding to the aromatic ring such as benzene or naphthalene ring is substituted by at least one hydroxyl group or by at least one hydroxyl group and at least one substituent other than hydroxyl group.

The substituent other than hydroxyl group includes, for example, $R^{17}$, $OR^{17}$, $SR^{17}$, $NR^{17}R^{18}$, a halogen atom, a nitro group, etc. In these, $R^{17}$ and $R^{18}$ each represents a hydrocarbon group having from 1 to 20 carbon atoms, such as an alkyl group, a cycloalkyl group, an aryl group, an aralkyl group or the like. The alkyl group includes, for example, a methyl group, an ethyl group, an n-propyl group, an isopropyl group, an n-butyl group, an isobutyl group, a sec-butyl group, a t-butyl group, a pentyl group, a hexyl group, an octyl group, a decyl group, a dodecyl group, etc.; the cycloalkyl group includes, for example, a cyclopentyl group, a cyclohexyl group, etc.; the aryl group includes, for example, a phenyl group, a tolyl group, etc.; and the aralkyl group includes, for example, a benzyl group, a phenethyl group, etc. Specific examples of $OR^{17}$ include an alkoxy group such as a methoxy group, an ethoxy group, an n-propoxy group, an isopropoxy group, an n-butoxy group, an isobutoxy group, a sec-butoxy group, a t-butoxy group, a pentoxy group, a hexoxy group, an octoxy group, a cyclohexoxy group, etc.; and an aryloxy group such as a phenoxy group, etc. Specific examples of $NR^{17}R^{18}$ include a dimethylamino group, a diethylamino group, a di(n-propyl)amino group, a diisopropylamino group, a di(n-butyl)amino group, a diisobutylamino group, a di(sec-butyl)amino group, a di(t-butyl)amino group, a dipentylamino group, a dihexylamino group, a dioctylamino group, a diphenylamino group, a dibenzylamino group, etc. The halogen atom includes chlorine, bromine, iodine and fluorine atoms.

The component (D) is comprised of a phenolic compound and/or water. The phenolic compound is preferably one substituted by one or more hydrocarbon group each having from 1 to 20 carbon atoms. Especially preferred are phenolic compounds in which the α,α'-positions relative to the hydroxyl group are substituted by hydrocarbon groups each having from 1 to 20 carbon atoms.

Specific examples of the phenolic compound include phenol, 2-methylphenol, 2-ethylphenol, 2-n-propylphenol, 2-isopropylphenol, 2-n-butylphenol, 2-sec-butylphenol, 2-tert-butylphenol, 3-tert-butylphenol, 4-tert-butylphenol, 4-tert-octylphenol, 2-n-dodecylphenol, 2-phenylphenol, 4-phenylphenol, 2, 6-dimethylphenol, 2, 6-diethylphenol, 2,6-di-tert-butylphenol, 2,4-di-tert-butylphenol, 2-tert-butyl-4-methylphenol, 2-tert-butyl-5-methylphenol, 2-tert-butyl-6-methylphenol, 2-n-dodecyl-4-methylphenol, 4-n-dodecyl-2-methylphenol, 2,6-diphenylphenol, 2,6-di-tert-butyl-4-methylphenol, 2,6-di-tert-butyl-4-ethylphenol, 2,4,6-tri-tert-butylphenol, 2,2'-methylenebis(4-methyl-6-tert-butylphenol), 2,2'-methylenebis(4-ethyl-6-tert-butylphenol), 4,4'-methylenebis(2,6-di-tert-butylphenol), 4,4'-butylidenebis(6-tert-butyl-m-cresol), 4,4'-thiobis(6-tert-butyl-m-cresol), α-naphthol, β-naphthol, 2-fluorophenol, 3-fluorophenol, 4-fluorophenol, 2,4-difluorophenol, 2,5-difluorophenol, 2,6-difluorophenol, 2-methoxyphenol, 3-methoxyphenol, 4-methoxyphenol, 2,6-di-tert-butyl-4-methoxyphenol, N,N-dimethyl-3-aminophenol, N,N-diethyl-3-aminophenol, N,N-di-n-butyl-3-aminophenol, 2,6-di-tert-butyl-4-dimethylaminophenol, 2-nitrophenol, 3-nitrophenol, 4-nitrophenol, 2-nitro-4-methylphenol, 3-nitro-4-methylphenol, 4-nitro-3-methylphenol, 5-nitro-2-methylphenol, catechol, resorcinol, hydroquinone, 3-methylcatechol, 4-methylcatechol, 4-tert-butylcatechol, 2-methylresorcinol, 5-methylresorcinol, methylhydroquinone, tert-butylhydroquinone, 2,5-di-tert-butylhydroquinone, 1,2-dihydroxynaphthalene, 1,4-dihydroxynaphthalene, 1,5-dihydroxynaphthalene, 1,6-dihydroxynaphthalene, 1,7-dihydroxynaphthalene, 2,3-dihydroxynaphthalene, 2,7-dihydroxynaphthalene, pyrogallol, phloroglucinol, 1,2,4-trihydroxybenzene, hexahydroxybenzene, 4,4-thiobis(2,6-di-tert-butylphenol), 3,5-di-tert-4-hydroxybenzyl chloride, etc.

These phenolic compounds can be used either singly or as combined.

In the polymerization catalyst (II) where the component (B') is an aluminoxane, the component (D) of a phenolic compound and/or water is preferably such that the ratio by mol of the hydroxyl group in the component (D) to the aluminoxane of the component (B'), in terms of aluminium, falls between 0.001 and 0.8. If said molar ratio is smaller than 0.001, the effect of the component (D) to improve the activity of the catalyst is poor; but if it is larger than 0.8, the activity of the catalyst is often lowered. In view of the effect of the component (D) to improve the activity of the catalyst, said molar ratio is more preferably between 0.01 and 0.6, even more preferably between 0.05 and 0.5. In this, one mol of water shall correspond to 2 mols of hydroxyl group.

To prepare the polymerization catalyst (II), the constituent components may be contacted with each other in any desired order with no limitation for said contacting. Preferably, however, the component (B') is first contacted with the component (D) and then with the component (A'), or alternatively, the component (B') is first contacted with the component (A') and then with the component (D), in view of the activity of the catalyst to be prepared.

The polymerization catalyst (II) may optionally contain any other catalytic components, in addition to the above-mentioned components (A'), (B') and (D), provided that the additional components do not interfere with the object of the present invention. Like those constituting the above-mentioned polymerization catalyst (I), the components constituting the polymerization catalyst (II) can be held on suitable carriers. For this, the components may be contacted with desired carriers.

Now, the polymerization catalyst (III) is referred to. The components (A') and (B') constituting the polymerization catalyst (III) and the ratio of the two in (III) may be the same as those in the above-mentioned polymerization catalyst (II).

If desired, the polymerization catalyst (III) may additionally contain the component (E) of (a) a reaction product of an organic aluminium compound and a phenolic compound, and/or (b) a reaction product of an organic aluminium compound and a boron compound, whereby the catalytic activity and copolymerization specificity of the catalyst (III) is further improved.

The organic aluminium compound to be used for producing the reaction product (a) may be the same as that of the component (C) to be in the above-mentioned polymerization catalyst (I), but is especially preferably a trialkylaluminium. The phenolic compound for the reaction product (a) may be the same as that of the component (D) to be in the above-mentioned polymerization catalyst (II).

The ratio of the phenolic compound to the organic aluminium compound is preferably from 0.1 to 2.5, more preferably from 0.5 to 2.2, even more preferably from 1.0 to 2.0, by mol. The reaction condition for producing the product (a) is not specifically defined. Advantageously, for example, the two, phenolic compound and organic aluminium compound, may be mixed and reacted in a suitable inert solvent, such as benzene, toluene, hexane, heptane or the like, with stirring at a temperature not higher than 40° C.

The reaction product thus obtained through the reaction of such an organic aluminium compound and a phenolic compound is preferably an organic aluminium compound of a general formula (VII):

$$R^{19}_m Al(OAr)_{3-m} \qquad (VII)$$

wherein $R^{19}$ represents a hydrocarbon group having from 1 to 20 carbon atoms, but preferably an alkyl group having from 1 to 10 carbon atoms;

Ar represents an aryl group having from 6 to 20 carbon atoms;

m represents a real number of from 1 to 2; and when the formula has a plurality of OAr's, said plural OAr's may be the same or different.

Specific examples of the organic aluminium compound of formula (VII) include dimethylaluminium phenoxide, methylaluminium diphenoxide, dimethylaluminium (2-methylphenoxide), dimethylaluminium (2-ethylphenoxide), dimethylaluminium (2-n-propylphenoxide), dimethylaluminium (2-tert-butylphenoxide), dimethylaluminium (4-tert-butylphenoxide), dimethylaluminium (2, 6-di-tert-butyphenoxide), methylaluminium di(2,6-di-tert-butylphenoxide), dimethylaluminium (2,4-di-tert-butylphenoxide), methylaluminium di(2,4-di-tert-butylphenoxide), dimethylaluminium (2,6-di-tert-butyl-4-methylphenoxide), methylaluminium di(2,6-di-tert-butyl-4-methylphenoxide), dimethylaluminium (2,6-di-tert-butyl-4-ethylphenoxide), methylaluminium di(2,6-di-tert-butyl-4-ethylphenoxide), dimethylaluminium (2,4,6-tri-tert-butylphenoxide), methylaluminium di(2,4,6 -tri-tert -butylphenoxide), dimethylaluminium (2,6-dimethylphenoxide), methylaluminium di (2, 6-dimethylphenoxide), dimethylaluminium (2,6-diphenylphenoxide), methylaluminium di(2,6-diphenylphenoxide), dimethylaluminium (2,6-difluorophenoxide), methylaluminium di(2,6-difluorophenoxide), methylaluminium di(1,1(-bi-2-naphthoxide), etc.; compounds that correspond to the above-mentioned ones but differ from the latter in that the former have any of ethyl, n-propyl, isopropyl, n-butyl, isobutyl, n-hexyl, n-octyl or the like group in place of the methyl group as bonded to the aluminium atom.

The organic aluminium compound to be used for producing the reaction product (b) may be the same as that for producing the above-mentioned reaction product (a). The boron compound for the reaction product (b) includes, for example, compounds of a general formula (Ic):

(Ic)

wherein X, Y and D each represent a sulfur or oxygen atom, and these may be the same or different.

The compounds of formula (Ic) include, for example, trihydroxyboron (boric acid), dihydroxyhydrothioxyboron, hydroxydihydrothioxyboron, trihydrothioxyboron, etc. Of these, preferred are trihydroxyboron, dihydroxyhydrothioxyboron and hydroxydihydrothioxyboron, and especially preferred is trihydroxyboron.

The ratio of the boron compound to the organic aluminium compound shall be a substantially stoichiometric one, or that is, substantially ⅓ by mol. The reaction of the two, the boron compound and the organic aluminium compound, is effected generally in an inert solvent in an inert gas atmosphere. The means of contacting the two with each other is not specifically defined, for which are employable various methods. For example, employable are (1) a method of dissolving a boron compound in a solvent of toluene, followed by adding thereto an organic aluminium compound directly or a suspension of an organic aluminium compound in toluene, little by little; (2) a method of adding a solution of a boron compound as diluted with hexane to a solution of an organic aluminium compound as diluted with hexane; and (3) a method of diluting a boron compound and an organic aluminium compound separately with toluene to give separate dilutions in separate containers, followed by dropwise putting them into a reactor at the same flow rate, and reacting the two, the boron compound and the organic aluminium compound in said reactor.

For these methods, the reaction temperature and the reaction time are not specifically defined. In general, however, it is desirable that the two, the boron compound and the organic aluminium compound are mixed at a low temperature, for example, falling between −78° C. and 30° C., preferably between −78° C. and 10° C., then gradually heated, and reacted at a temperature falling between −10° C. and 80° C. or so. If desired, the reaction system may be heated up to the boiling point of the reaction solvent used. The reaction time is generally between 2 and 48 hours or so.

The reaction product thus obtained through the reaction of such an organic aluminium compound and a boron compound is preferably an organic aluminium compound of a general formula (VIII):

$$(R^{20}R^{21}AlO)_3B \qquad (VIII)$$

wherein $R^{20}$ and $R^{21}$ each represent a hydrocarbon group having from 1 to 20 carbon atoms, but preferably an alkyl group having from 1 to 10 carbon atoms; and these may be the same or different; and three $(R^{20}R^{21}AlO)$'s may be the same or different.

Specific examples of the organic aluminium compound of formula (VIII) include tris(dimethylaluminoxy)borane, tris (diethylaluminoxy)borane, tris(di-n-propylaluminoxy) borane, tris(diisopropylaluminoxy)borane, tris (diisobutylaluminoxy)borane, tris(di-n-hexylaluminoxy) borane, tris(di-n-octylaluminoxy)borane, tris (methylethylaluminoxy)borane, tris (ethylisobutylaluminoxy)borane, etc.

In the polymerization catalyst (III), the component (E) may be comprised of one or more of the reaction products (a), or one or more of the reaction products (b), or a combination of one or more of the reaction products (a) and one or more of the reaction products (b).

In the catalyst (III), the ratio of the component (A') to the component (E) is preferably from 1/1 to 1/10000, more preferably from 1/5 to 1/2000, even more preferably from 1/10 to 1/1000, in view of the activity of the catalyst.

The polymerization catalyst (III) may optionally contain any other catalytic components, in addition to the above-mentioned components (A'), (B') and (E), provided that the additional components do not interfere with the object of the present invention. If desire, the components constituting the polymerization catalyst (III) can be held on suitable carriers. For this, the components may be contacted with desired carriers. The carriers include, for example, inorganic oxides such as silica, alumina, etc.; inorganic halides such as magnesium chloride, etc.; inorganic alkoxides such as diethoxymagnesium, etc.; and polymers such as polystyrene, etc.

The ethylenic, copolymers (I) and (II) of the present invention can be produced by copolymerizing (a) ethylene and (b) at least one selected from α-olefins having from 3 to 20 carbon atoms, diene compounds and cyclic olefins, in the presence of any of the above-mentioned polymerization catalyst (I), (II) or (III).

The polymerization for the invention is not specifically defined, for which is employable is any method of slurry polymerization, vapor phase polymerization, bulk polymerization, solution polymerization, suspension polymerization and the like. Especially preferred is slurry polymerization or vapor phase polymerization.

Regarding the polymerization condition, the polymerization temperature is generally between −100 and 250° C., preferably between −50 and 200° C., more preferably between 0 and 130° C. The ratio of the monomer reactants to the catalyst is desirably such that the ratio of (starting monomers)/(transition metal compound) is preferably between 1 and $10^8$, more preferably between 100 and $10^5$, by mol. The polymerization time may be generally between 5 minutes and 10 hours; and the reaction pressure may be between ordinary pressure and 200 kg/cm$^2$G, preferably between ordinary pressure and 100 kg/cm$^2$G.

To control the molecular weight of the polymer to be produced, for example, the type and the amount of each component constituting the catalyst to be used is suitably selected and the polymerization temperature is suitably settled. If desired, the polymerization may be effected in the presence of hydrogen.

The polymerization solvent, if used, may include, for example, aromatic hydrocarbons such as benzene, toluene, xylene, ethylbenzene, etc.; alicyclic hydrocarbons such as cyclopentane, cyclohexane, methylcyclohexane, etc.; aliphatic hydrocarbons such as pentane, hexane, heptane, octane, etc.; halogenated hydrocarbons such as chloroform, dichloromethane, etc. These solvents can be used either singly or as combined. α-olefin monomers, if used, may act also as a monomer. Depending on its mode, the polymerization may be effected in the presence of no solvent.

The molecular weight of the copolymer thus produced in the manner mentioned hereinabove is not specifically defined, but it is desirable that the intrinsic viscosity [η] (as measured in decalin at 135° C.) is not smaller than 0.1 dl/g, preferably not smaller than 0.2 dl/g.

In the present invention, the above-mentioned polymerization catalysts can be subjected to pre-polymerization. The pre-polymerization can be effected, for example, by contacting a small amount of an olefin with the solid component constituting the catalyst, and it is not specifically defined. Any known method is employable for the pre-polymerization. The olefin to be used for the pre-polymerization is not specifically defined, and may include, for example, ethylene and others such as those concretely exemplified hereinabove. For example, employable are α-olefins having from 3 to 20 carbon atoms, and even mixtures of these. It is advantageous that the olefins for the pre-polymerization are the same as those to be copolymerized to give the copolymers of the invention.

The pre-polymerization temperature is generally between −20 and 200° C., preferably between −10 and 130° C., more preferably between 0 and 80° C. The pre-polymerization may be effected in a solvent, which may be selected from inert hydrocarbons, aliphatic hydrocarbons, aromatic hydrocarbons, monomers, etc. Of these, preferred are aliphatic hydrocarbons. The pre-polymerization may also be effected in the presence of no solvent.

Desirably, the pre-polymerization is so controlled that the product of the pre-polymerization may have an intrinsic viscosity [η] (as measured in decalin at 135° C.) is not smaller than 0.2 dl/g, preferably not smaller than 0.5 dl/g, that the amount of the pre-polymerized product, relative to 1 mmol of the transition metal component constituting the catalyst used, is from 1 to 10000 g, preferably from 10 to 1000 g.

In that manner mentioned hereinabove, the ethylenic copolymers (I) and (II) of the present invention can be produced efficiently.

The present invention also provides ethylenic copolymer compositions (I) and (II), which comprise (A) any of the above-mentioned ethylenic copolymer (I) or (II) in which the component (b) is an α-olefin having from 3 to 20 carbon atoms, and (B) an ethylenic copolymer which is obtained through copolymerization of ethylene and an α-olefin having from 3 to 20 carbon atoms, and which has a weight average molecular weight (Mw), as measured through gel permeation chromatography in terms of polyethylene, to fall between 3,000 and 1,000,000, and has a resin density to fall between 0.85 and 0.95 g/cm$^3$. These compositions of the invention have improved tear strength, while having good impact resistance. Therefore, these compositions can be formed into films having both good impact strength and good tear strength.

In the ethylenic copolymer compositions of the invention, the content of the component (A) is preferably not smaller than 20% by weight of the total weight of the composition. If its content is smaller than 20% by weight, the component (A) could not satisfactorily exhibit its effect to improve the tear strength of the compositions. In view of the effect of the component (A), therefore, the content of the component (A) in the compositions of the invention is more preferably not smaller than 50% by weight.

The other ethylenic copolymer of the component (B) that constitutes the ethylenic copolymer compositions of the invention is obtained through copolymerization of ethylene and an α-olefin having from 3 to 20 carbon atoms; and its weight average molecular weight (Mw), as measured through gel permeation chromatography in terms of polyethylene, falls between 3,000 and 1,000,000; and its resin density falls between 0.85 and 0.95 g/cm³. The α-olefins having from 3 to 20 carbon atoms to be used for producing the ethylenic copolymer of the component (B) may be the same as those to be used for producing the above-mentioned component (A). The ethylenic copolymer of the component (B) must have Mw of from 3,000 to 1,000,000. This is because if the copolymer has Mw of smaller than 3,000, the composition comprising the copolymer could not have good mechanical properties; but if it has Mw of larger than 1,000,000, the shapability and workability of the composition comprising the copolymer is poor. In view of the balance of the mechanical properties and the shapability and workability of the copolymer composition, it is preferable that the copolymer has Mw of from 10,000 to 800,000, more preferably from 15,000 to 600,000. The ethylenic copolymer of the component (B) must have a resin density of from 0.85 to 0.95 g/cm³. This resin density of the copolymer can be well controlled within the defined range by increasing or decreasing the comonomer unit content of the copolymer.

The method of producing the ethylenic copolymer of the component (B) is not specifically defined. To produce the ethylenic copolymer, for example, ethylene and an α-olefin having from 3 to 20 carbon atoms such as that mentioned hereinabove are copolymerized in the presence of an ordinary catalyst that is generally used in the production of ordinary ethylenic copolymers. The catalyst to be used for said copolymerization may include the catalysts to be used for producing the above-mentioned ethylenic copolymer of the other component (A), and may be any type of catalysts held on carriers or homogeneous catalysts. The condition for the copolymerization to produce the ethylenic copolymer of the component (B) is not also specifically defined. For example, the copolymerization may be effected under the same condition as that for the production of the ethylenic copolymer of the component (A).

The ethylenic copolymer composition of the present invention can be produced by homogeneously mixing the ethylenic copolymer of the component (A) and the ethylenic copolymer of the component (B). To mix these, any known method is employable. For example, the two may be mixed in melt, using a mixer or an extruder; or the two may be mixed in solution.

The ethylenic copolymer (II) or the ethylenic copolymer composition (II) of the present invention, having the properties mentioned hereinabove, may be shaped through melt extrusion including, for example, air-cooling inflation molding, air-cooling two-stage inflation molding, water-cooling inflation molding, T-die casting molding, etc., to thereby obtain films of the invention. The film of the invention may have either a single-layered structure or a multi-layered structure, and its thickness is not specifically defined. In general, however, the thickness of the film is from 10 μm to 3 mm. Therefore, the film of the invention includes so-called thick sheets.

The thus-shaped film of the present invention may be laminated through dry lamination or extrusion lamination (sandwich lamination) with any of nylon, polyethylene terephthalate, ethylene-vinyl alcohol copolymers, etc., or with a barrier metal such as aluminium (for example, metal-deposited film or foil), via an adhesive or a polyolefinic resin, to give composite films such laminate films. In these, the film of the present invention is preferably used in the form of a heat-sealing layer.

Where the ethylenic copolymer (II) or the ethylenic copolymer composition (II) of the present invention is shaped into films, any ordinary additives that are generally used in forming films may be added thereto, if desired. The additives include, for example, antioxidants, ultraviolet absorbents, photo-stabilizers, thermal stabilizers neutralizing agents, lubricants, anti-blocking agents, antistatic agents, colorants, etc.

The films of the present invention thus produced have good mechanical characteristics such as high tear strength and high impact strength, and also have good heat-sealing properties and high ESCR. Therefore, the films are favorably usable in various fields of inflation films, cast films, sealants, laminates and wrapping materials.

Now, the present invention is described in more detail with reference to the following Examples, which, however, are not intended to restrict the scope of the invention.

EXAMPLE 1

(1) Preparation of Aluminium Catalyst Component:

A toluene solution of methylaluminoxane having a concentration of 1.4 mols/liter in terms of Al (produced by ALBEMARLE Corporation) was used herein. To 4.2 mols, in terms of Al, of the solution, gradually and dropwise added was 0.2 molar times, in terms of Al of methylaluminoxane, of 2,6-di-t-butylphenol, over a period of 1 hours, with stirring at room temperature in a nitrogen atmosphere. Next, these were reacted for further one hour to obtain an aluminium catalyst component.

(2) Production of Ethylene/Octene-1 Copolymer:

Into a continuous polymerization reactor having an inner volume of 1 liter, fed were n-hexane at a flow rate of 6.0 liters/hour, ethylene at a flow rate of 700 g/hour, hydrogen at a flow rate of 0.27 g/hour, and octene-1 at a flow rate of 900 g/hour.

Next, a catalyst solution of pentamethylcyclopentadienyltitanium trimethoxide and the methylaluminoxane solution prepared in (1) were fed into said reactor at a flow rate of 1.67 mmols/hour in terms of Ti for the former and 72 mmols/hour in terms of Al for the latter, through different lines. The monomers were copolymerized at 186° C. to obtain an ethylene/octene-1 copolymer.

(3) Evaluation of Copolymer:

The copolymer obtained in (2) was analyzed. The data obtained are shown in Table 1 below.

EXAMPLE 2

(1) Preparation of Aluminium Catalyst Component:

Water-containing nitrogen was introduced into 0.2 mols, in terms of Al, of a toluene solution of methylaluminoxane having a concentration of 1.4 mols/liter in terms of Al (produced by ALBEMARLE Corporation), at room temperature. The introduction was effected slowly over a period of 16 hours, whereby 0.16 molar times, relative to Al, of water was introduced into the solution. Next, these were reacted for further 5 hours to obtain an aluminium catalyst component.

(2) Production of Ethylene/Octene-1 Copolymer:

Into a pressure autoclave (inner volume: 4 liters) equipped with a stirrer, were put 1560 ml of toluene, 40 ml of octene-1 and 4 mols, in terms of Al, of the methylaluminoxane prepared in (1), and heated up to 60° C. with stirring in a nitrogen atmosphere. This condition was kept as such for 5 minutes. Next, 40 pmols, in terms of Ti, of a catalyst solution of pentamethylcyclopentadienyltitanium trimethoxide was added thereto, and heated up to 65° C. Hydrogen was introduced into the autoclave at 1.0 kg/cm$^2$G, and then ethylene was continuously introduced thereinto at a constant pressure of 4 kg/cm$^2$G. In that condition, the monomers were copolymerized at 65° C. for 30 minutes.

After the reaction, the autoclave was degassed, the catalyst was inactivated with an alcohol, and the copolymer was taken out and dried. The copolymer obtained was ethylene-octene-1 copolymer and its yield was 76 g.

(3) Evaluation of Copolymer:

The copolymer obtained in (2) was analyzed. The data obtained are shown in Table 1 below.

EXAMPLE 3

Into a continuous polymerization reactor having an inner volume of 1 liter, fed were n-hexane at a flow rate of 5.5 liters/hour, ethylene at a flow rate of 700 g/hour, and octene-1 at a flow rate of 900 g/hour. Hydrogen was introduced thereinto at a pressure of 28 kg/cm$^2$. On the other hand, catalyst components of pentamethylcyclopentadienyltitanium trichloride (1.33 mmols/hour), methylaluminoxane (72 mmols/hour in terms of Al) and methylaluminium bis(2,6-di-t-butylphenoxide) (2 mmols/hour in terms of Al) were kept in contact all together. The resulting catalyst system was fed into the reactor. The monomers were copolymerized at a temperature of 185° C. and under a pressure of 70 kg/cm$^2$ to obtain an ethylene-octene-1 copolymer, A-1.

The copolymer thus obtained was analyzed. The data obtained are shown in Table 1.

TABLE 1

|  |  | Example 1 | Example 2 | Example 3 |
|---|---|---|---|---|
| Resin Density (g/cm$^3$) | | 0.911 | 0.918 | 0.917 |
| Molecular Weight Distribution [Mw/Mn] | | 2.2 | 2.7 | 1.9 |
| Weight Average Molecular Weight [Mw] | | 77,000 | 60,000 | 100,000 |
| Octene-1 Unit Content (mol %) | | 4.8 | 3.6 | 3.9 |
| Half Width at Half Maximum [W/2] | | 9.4 | 8.3 | 6.8 |
| Number of Branches [n] (per 1000 carbons) | | 24 | 18 | 18 |
| Compositional Distribution [area fraction of each range, %] | A Range | 81.3 | 75.0 | 67.2 |
| | B Range | 12.6 | 22.0 | 3.8 |
| | C Range | 2.8 | 1.7 | 25.4 |
| | D Range | 3.3 | 1.3 | 3.6 |
| Tear Strength (kgf/cm) | | 225 | 235 | 193 |

COMPARATIVE EXAMPLE 1

Sample A of an ethylene/octene-1 copolymer (octene-1 unit content: 2.7 mol %), Sample B of an ethylene/octene-1 copolymer (octene-1 unit content: 4.4 mol %) and Sample C of an ethylene/octene-1 copolymer (octene-1 unit content: 4.6 mol %) were analyzed. The data obtained are shown in Table 2 below.

TABLE 2

|  |  | Sample A | Sample B | Sample C |
|---|---|---|---|---|
| Resin Density (g/cm$^3$) | | 0.919 | 0.907 | 0.908 |
| Molecular Weight Distribution [Mw/Mn] | | 2.1 | 2.2 | 4.3 |
| Weight Average Molecular Weight [Mw] | | 85,000 | 63,000 | 82,000 |
| Octene-1 Unit Content (mol %) | | 2.7 | 4.4 | 4.6 |
| Half Width at Half Maximum [W/2] | | 2.5 | 3.6 | 12.5 |

TABLE 2-continued

|  |  | Sample A | Sample B | Sample C |
|---|---|---|---|---|
| Number of Branches [n] (per 1000 carbons) | | 13.5 | 22 | 25 |
| Compositional Distribution [area fraction of each range, %] | A Range | 67.9 | 58.9 | 40.2 |
| | B Range | 30.6 | 36.7 | 27.3 |
| | C Range | 0 | 1.6 | 25.4 |
| | D Range | 1.5 | 2.8 | 7.1 |
| Tear Strength (kgf/cm) | | 157 | 98 | 154 |

EXAMPLES 4 AND 5, AND REFERENCE EXAMPLES 1 TO 3

The components shown in Table 3 below were mixed in the ratio indicated therein to prepare various ethylenic copolymer compositions. Briefly, using Laboplastomill (manufactured by Toyo Seiki KK), the components were melted and kneaded at 170° C. and at 20 rpm for 5 minutes in a 30-cc mixer. Each composition thus obtained was shaped under pressure to give test sheets (thickness: 60 to 70 μm, size: 20 cm×20 cm), which were tested for their tear strength and tensile impact strength. Briefly, using a 50-ton press (manufactured by Hokujuji KK), each composition was pressed at 230° C. and under 50 kg/cm$^2$ for 5 minutes, and then cooled to 50° C. over a period of 3 minutes.

These test sheets were tested according to JIS K-7128 for their Elemendorf tear strength, and according to ASTM D1822 for their tensile impact strength. The MI of each composition was measured at 190° C. and under a load of 2.16 kg. The data obtained are shown in Table 3.

In addition, the compositions prepared herein were analyzed, and the data obtained are shown in Table 3.

TABLE 3

|  | Example | | Reference Example | | |
|---|---|---|---|---|---|
|  | 4 | 5 | 1 | 2 | 3 |
| Component 1 | A-1 | A-1 | A-1 | — | — |
| Component 2 | Sample B | Sample C | — | Sample B | Sample C |
| Ratio of Component 1/Component 2 | 50/50 | 50/50 | 100/0 | 0/100 | 0/100 |
| MI (g/10 min) | 0.9 | 2.0 | 0.6 | 0.9 | 3.4 |
| Resin Density (g/cm$^3$) | 0.911 | 0.912 | 0.917 | 0.907 | 0.908 |
| Tear Strength (kgf/cm) | 188 | 197 | 193 | 98 | 154 |
| Tensile Impact Strength (kgfcm/cm$^2$), found | 1990 | 1460 | 1850 | 1850 | 1070 |
| Tensile Impact Strength (kgfcm/cm$^2$), calculated | 1850 | 1460 | — | — | — |

As has been mentioned hereinabove with reference to its embodiments, the ethylenic copolymer of the present invention has a narrow molecular weight distribution and a narrow branching degree distribution while having a controlled compositional distribution profile, and therefore can be formed into films having good mechanical characteristics including tear strength and having good heat-sealing properties and high ESCR. The ethylenic copolymer composition of the present invention, as comprising said ethylenic copolymer and an additional ethylenic copolymer having a narrow molecular weight distribution and a broad compositional distribution and capable of forming films with high tensile strength, can form a film having both good impact strength and good tear strength, or that is, the tear strength of the film is improved without sacrificing its impact strength.

While the invention has been described in detail and with reference to specific embodiments thereof, it will be apparent to one skilled in the art that various changes and modifications can be made therein without departing from the spirit and scope thereof.

What is claimed is:

1. A film formed from an ethylenic copolymer obtained through copolymerization of (a) ethylene and (b) at least one member selected from α-olefins having from 3 to 20 carbon atoms, diene compounds and cyclic olefins, wherein:

(1) the ratio of the weight average molecular weight (Mw) of the copolymer to the number average molecular weight (Mn) thereof, Mw/Mn, falls between 1.5 and 4, said molecular weights being measured through gel permeation chromatography in terms of polyethylene, and the weight average molecular weight (Mw) falls between 3,000 and 1,000,000, (2) a compositional distribution curve of the copolymer obtained through temperature rising elution fractionation analysis contains an essential peak consisting of the following areas, all shown in FIG. 1, an area A, an area B, an area C, and a peak defining an area D that is attributable to a high branch component, wherein the area A indicates the range that is surrounded by a curve as obtained through Gaussian distribution approximation relative to the essential peak and a base line of the compositional distribution curve; the area B indicates the range that is surrounded by the compositional distribution curve, the Gaussian distribution approximation curve, and the base line and that is in the lower elution temperature side and is at an elution temperature higher than 32° C.; the area C indicates the range that is surrounded by the essential peak, the Gaussian distribution approximation curve, and the base line and that is in the higher elution temperature side; and the area D indicates the range that is surrounded by the compositional distribution curve and the base line and that is at an elution temperature between 25 and 32° C.;

(3) the relationship between the half width at the half maximum (W/2) (°C.) of the Gaussian distribution approximation curve, and the average, n, of short-chain branches existing in the copolymer (per 1000 carbon atoms of the copolymer) satisfies the following equation:

$$0.704+0.147n \leq W/2 \leq -0.055+0.577n,$$

and (4) the resin density of the copolymer falls between 0.85 and 0.95 g/cm$^3$ and the tear strength (TS, kgf/cm) of the copolymer satisfies the following equations:

$$TS \geq 131.5 - 155 \times \log\left[\{B+C+D\}/A\} + 0.1\right],$$

and $$0.1 \leq (B+C+D)/A \leq 1$$

wherein A, B, C, and D are as defined above.

2. The film as claimed in claim 1, wherein the ethylene copolymer is obtained through copolymerization of ethylene and an α-olefin having from 3 to 20 carbon atoms.

* * * * *